US008738407B2

(12) United States Patent
Stewart et al.

(10) Patent No.: US 8,738,407 B2
(45) Date of Patent: *May 27, 2014

(54) COMPUTER READABLE MEDIUM CONTAINING A SET OF COMPUTER READABLE INSTRUCTIONS FOR GRID-BASED INSURANCE RATING

(71) Applicant: State Farm Mutual Automobile Insurance Company, Bloomington, IL (US)

(72) Inventors: Curt Stewart, Bloomington, IL (US); Matthew T. Frank, Bloomington, IL (US); Neale McCormick, Bloomington, IL (US); Matt Baughman, Normal, IL (US); Rama Duvvuri, Bloomington, IL (US)

(73) Assignee: State Farm Mutual Automobile Insurance Company, Bloomington, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/851,217

(22) Filed: Mar. 27, 2013

(65) Prior Publication Data

US 2013/0218607 A1    Aug. 22, 2013

Related U.S. Application Data

(62) Division of application No. 13/226,785, filed on Sep. 7, 2011, now Pat. No. 8,504,393.

(60) Provisional application No. 61/381,885, filed on Sep. 10, 2010.

(51) Int. Cl.
   *G06Q 40/00* (2012.01)

(52) U.S. Cl.
   USPC .................................................. 705/4; 705/35

(58) Field of Classification Search
   USPC .......................................................... 705/4, 35
   See application file for complete search history.

(56) References Cited

U.S. PATENT DOCUMENTS

| 5,796,634 A | * | 8/1998 | Craport et al. | 702/150 |
| 5,848,373 A | * | 12/1998 | DeLorme et al. | 701/455 |
| 5,897,619 A | * | 4/1999 | Hargrove et al. | 705/4 |
| 6,186,793 B1 | * | 2/2001 | Brubaker | 434/107 |

(Continued)

OTHER PUBLICATIONS

Pasture, Rangeland, Forage Rainfall Index Plan of Insurance. USDA Risk Management Agency. 2006. http://www.rma.usda.gov/policies/pastu rerangeforage/PRF-RI-Condensed.pdf.*

(Continued)

*Primary Examiner* — Narayanswamy Subramanian
(74) *Attorney, Agent, or Firm* — King & Spalding L.L.P.

(57) ABSTRACT

A computer readable medium containing a set of computer readable instructions that when loaded into a computer configure that computer to: receive demographic data, fire station data, or other data associated with a location; receive a coordinate pair including a longitude and latitude of a location; determine a coordinate grid block bounded by latitude and longitude lines, which grid block is associated with the coordinate pair; query a database for a plurality of existing data associated with the coordinate grid block; and determine a rate based at least in part on the plurality of existing data and the demographic data, fire station data, or other data associated with a location.

7 Claims, 33 Drawing Sheets

(56) References Cited

U.S. PATENT DOCUMENTS

| | | | |
|---|---|---|---|
| RE40,466 E * | 8/2008 | Wallner | 341/50 |
| 7,441,197 B2 * | 10/2008 | Tschiegg et al. | 715/741 |
| 7,557,730 B2 * | 7/2009 | Gueziec | 340/905 |
| 7,596,542 B1 * | 9/2009 | Woll | 701/532 |
| 7,769,608 B1 * | 8/2010 | Woll et al. | 705/4 |
| RE41,983 E * | 12/2010 | Wallner | 341/50 |
| 7,880,642 B2 * | 2/2011 | Gueziec | 340/905 |
| 7,956,542 B2 | 6/2011 | Matsuzaki et al. | 313/594 |
| 7,966,301 B2 | 6/2011 | Toyama et al. | 707/696 |
| 8,321,472 B1 * | 11/2012 | Wolf | 707/803 |
| 8,364,515 B1 * | 1/2013 | Procopiuc | 705/7.29 |
| 8,504,393 B2 | 8/2013 | Stewart et al. | 705/4 |
| 2004/0225665 A1 * | 11/2004 | Toyama et al. | 707/100 |
| 2006/0100912 A1 | 5/2006 | Kumar et al. | 705/4 |
| 2006/0271531 A1 * | 11/2006 | O'Clair et al. | 707/5 |
| 2009/0132163 A1 * | 5/2009 | Ashley et al. | 701/206 |
| 2009/0216918 A1 * | 8/2009 | Cardullo | 710/26 |
| 2009/0298511 A1 * | 12/2009 | Paulson | 455/456.1 |
| 2009/0303036 A1 * | 12/2009 | Sahuguet | 340/539.13 |
| 2010/0026683 A1 * | 2/2010 | Araki et al. | 345/420 |
| 2011/0317154 A1 * | 12/2011 | Tan et al. | 356/139.03 |
| 2013/0211861 A1 * | 8/2013 | Stewart et al. | 705/4 |
| 2013/0226625 A1 * | 8/2013 | Stewart et al. | 705/4 |
| 2013/0325520 A1 * | 12/2013 | Stewart et al. | 705/4 |

OTHER PUBLICATIONS

Venter, Gary G., "Classical Partial Credibility with Application to Trend," Proceedings of the Casualty Actuarial Society, 31 pages, 1986.

Herzog, Thomas N., "Credibility: The Bayesian Model Versus Bühlmann's Model," Transactions of Society of Actuaries, vol. 41, 46 pages, 1989.

Brubaker, Randall E., "Geographic Rating of Individual Risk Transfer Costs Without Territorial Boundaries," Casualty Actuarial Society Forum, Casualty Actuarial Society, 24 pages, 1996.

Booth, P. et al., Modern Actuarial Theory and Practice, Chapman & Hall/CRC, 13 pages, 1999.

"State Farm Mutual Automobile Insurance Company Vermont Auto Insurance Program—Filing Memorandum," 7 pages, Dec. 7, 2009.

* cited by examiner

Figure 9A
Representative Distance Weighting Values

| GRID Ring * | Distance Weight |
|---|---|
| 0 | 1.000 |
| 1 | 1.000 |
| 2 | 1.000 |
| 3 | 1.000 |
| 4 | 0.800 |
| 5 | 0.650 |
| 6 | 0.550 |
| 7 | 0.450 |
| 8 | 0.350 |
| 9 | 0.300 |
| 10 | 0.250 |
| 11 | 0.200 |
| 12 | 0.170 |
| 13 | 0.140 |
| 14 | 0.110 |
| 15 | 0.090 |

\* GRID rings are a collection of GRID cells with similar distance from a target GRID cell. Larger ring assignments represent further distances from the target GRID cell.

FIG. 9B

| FIG. |
|---|
| 9B-1 |
| 9B-2 |

FIG. 9B-1

| | PREMIUM DATA | GRID CELL EXPERIENCE AREA | STATEWIDE | DESCRIPTION |
|---|---|---|---|---|
| (1) | CURRENT LEVEL PREMIUM | 260,856.25 | 100,000,000.00 | HISTORICAL PREMIUM ADJUSTED TO CURRENT RATE LEVEL |
| (2) | EXPOSURE | 5,205.00 | 2,000,000.00 | |
| (3) | CURRENT LEVEL PREMIUM/EXPOSURE | 50.12 | 50.00 | (1) / (2) |
| (4) | RELATIVE TO STATEWIDE | 1.002 | 1.000 | (3) / SW(3) |

| | LOSS DATA | GRID CELL EXPERIENCE AREA | STATEWIDE | DESCRIPTION |
|---|---|---|---|---|
| (5) | NON-CATASTROPHE LOSS AND ALAE | 1,120,750.00 | 300,000,000.00 | |
| (6) | EXPOSURE | 18,143.75 | 5,000,000.00 | |
| (7) | NON-CATASTROPHE LOSS AND ALAE/EXPOSURE | 61.77 | 60.00 | (5) / (6) |
| (8) | CATASTROPHE PROVISION | 0.200 | 0.200 | GRID CELL CATASTROPHE PROVISION |
| (9) | EXPECTED CATASTROPHE LOSS AND ALAE/EXPOSURE | 12.35 | 12.00 | (7) * (8) |
| (10) | TOTAL LOSS AND ALAE/EXPOSURE | 74.12 | 72.00 | (7) + (8) |
| (11) | RELATIVE TO STATEWIDE | 1.029 | 1.000 | (10) / SW(10) |
| (12) | EXPENSE FLATTENING PROVISION | 0.100 | 0.100 | |
| (13) | EXPENSE FLATTENED FACTOR | 1.026 | 1.000 | (11) * [1 - (12)] + (12) |

FIG. 9B-2

|      | INDICATED FACTOR | GRID CELL EXPERIENCE AREA | STATEWIDE | DESCRIPTION |
|------|------------------|---------------------------|-----------|-------------|
| (14) | PRESENT FACTOR | 1.500 | 1.000 | |
| (15) | INDICATED CHANGE | 2.4% | 0.0% | |
| (16) | INITIAL INDICATED FACTOR | 1.536 | 1.000 | (14) * [1 + (15)] |
| (17) | CREDIBILITY STANDARD | 1,600 | | BASED ON 90% CONFIDENCE INTERVAL AND 15% ERROR |
| (18) | NON-CATASTROPHE CLAIMS | 996 | | |
| (19) | CREDIBILITY | 0.789 | | MINIMUM{[(18) / (17)]^[0.5], 1.000} |
| (20) | CREDIBILITY COMPLEMENT | 1.500 | | (16) * (19) + (20) * [1 - (19)]; |
| (21) | CREDIBILITY WEIGHTED INDICATED FACTOR | 1.528 | 0.980 | SW(21) = WEIGHTED AVERAGE (21) OVER ALL GRID CELLS |
| (22) | BALANCED INDICATED FACTOR | 1.559 | 1.000 | (21) / SW(21) |
| (23) | BALANCED INDICATED CHANGE | 3.9% | 0.0% | (22) / (14) -1 |

| RING ASSIGNMENT | (1) DISTANCE WEIGHT | (2) NON-CATASTROPHE CLAIMS | (3) NON-CATASTROPHE CLAIMS USED | (4) DISTANCE WEIGHTED NON-CATASTROPHE CLAIMS USED |
|---|---|---|---|---|
| 0 | 1.0000 | 0 | 0 | 0 |
| 1 | 1.0000 | 75 | 75 | 75 |
| 2 | 1.0000 | 100 | 100 | 100 |
| 3 | 1.0000 | 200 | 200 | 200 |
| 4 | 0.8000 | 150 | 150 | 120 |
| 5 | 0.6500 | 800 | 771 | 501 |
| TOTAL | | 1,325 | 1,296 | 996 |

| RING ASSIGNMENT | (5) CURRENT LEVEL PREMIUM | (6) PREMIUM EXPERIENCE PERIOD EXPOSURE | (7) NON-CATASTROPHE LOSS AND ALAE | (8) LOSS AND ALAE EXPERIENCE PERIOD EXPOSURE |
|---|---|---|---|---|
| 0 | 0.00 | 0.00 | 0.00 | 0.00 |
| 1 | 15,000.00 | 400.00 | 75,000.00 | 1,000.00 |
| 2 | 10,000.00 | 200.00 | 100,000.00 | 750.00 |
| 3 | 40,000.00 | 900.00 | 250,000.00 | 3,000.00 |
| 4 | 100,000.00 | 1,500.00 | 400,000.00 | 5,000.00 |
| 5 | 185,000.00 | 4,000.00 | 600,000.00 | 15,000.00 |
| TOTAL | 350,000.00 | 7,000.00 | 1,425,000.00 | 24,750.00 |

| RING ASSIGNMENT | ADJUSTED DATA | | | |
|---|---|---|---|---|
| | (9) CURRENT LEVEL PREMIUM | (10) PREMIUM EXPERIENCE PERIOD EXPOSURE | (11) NON-CATASTROPHE LOSS AND ALAE | (12) LOSS AND ALAE EXPERIENCE PERIOD EXPOSURE |
| 0 | 0.00 | 0.00 | 0.00 | 0.00 |
| 1 | 15,000.00 | 400.00 | 75,000.00 | 1,000.00 |
| 2 | 10,000.00 | 200.00 | 100,000.00 | 750.00 |
| 3 | 40,000.00 | 900.00 | 250,000.00 | 3,000.00 |
| 4 | 80,000.00 | 1,200.00 | 320,000.00 | 4,000.00 |
| 5 | 115,856.25 | 2,505.00 | 375,750.00 | 9,393.75 |
| TOTAL | 260,856.25 | 5,205.00 | 1,120,750.00 | 18,143.75 |

(3) ACTUAL CLAIMS IN THE OUTER MOST RING ARE LIMITED SUCH THAT THE CLAIMS USED DOES NOT EXCEED THE NUMBER OF CLAIMS AT THE SELECTED MAXIMUM CREDIBILITY.
(9) (5) * (4) / (2)
(10) (6) * (4) / (2)
(11) (7) * (4) / (2)
(12) (8) * (4) / (2)

| FIG. 9D-1 |
|---|
| FIG. 9D-2 |

FIG. 9D-1

| GRID CELL | DISTANCE FROM TARGET GRID CELL (MILES) | GRID RING | CURRENT LEVEL PREMIUM | PREMIUM EXPERIENCE PERIOD EXPOSURE | NON-CATASTROPHE CLAIMS | NON-CATASTROPHE LOSS AND ALAE | LOSS AND ALAE EXPERIENCE PERIOD EXPOSURE |
|---|---|---|---|---|---|---|---|
| 0369010450 | 0.000 | 0 | 0.00 | 0.00 | 0.00 | 0.00 | 0.00 |
| 0369010449 | 0.553 | 1 | 750.00 | 20.00 | 1.00 | 3,750.00 | 50.00 |
| 0369010451 | 0.553 | 1 | 562.50 | 15.00 | 0.00 | 2,625.00 | 35.00 |
| 0369110450 | 0.691 | 1 | 150.00 | 4.00 | 4.00 | 1,125.00 | 15.00 |
| 0368910450 | 0.691 | 1 | 187.50 | 5.00 | 3.00 | 1,125.00 | 15.00 |
| 0369110449 | 0.885 | 1 | 75.00 | 2.00 | 0.00 | 375.00 | 5.00 |
| 0369110451 | 0.885 | 1 | 450.00 | 12.00 | 4.00 | 2,250.00 | 30.00 |
| 0368910449 | 0.885 | 1 | 37.50 | 1.00 | 0.00 | 375.00 | 5.00 |
| 0368910451 | 0.885 | 1 | 75.00 | 2.00 | 2.00 | 375.00 | 5.00 |
| 0369010448 | 1.105 | 1 | 562.50 | 15.00 | 3.00 | 2,625.00 | 35.00 |
| 0369010452 | 1.105 | 1 | 375.00 | 10.00 | 1.00 | 1,875.00 | 25.00 |
| 0369110448 | 1.303 | 1 | 712.50 | 19.00 | 5.00 | 3,375.00 | 45.00 |
| 0369110452 | 1.303 | 1 | 562.50 | 15.00 | 2.00 | 3,000.00 | 40.00 |
| 0368910448 | 1.304 | 1 | 487.50 | 13.00 | 3.00 | 2,250.00 | 30.00 |
| ○○○ | ○○○ | ○○○ | ○○○ | ○○○ | ○○○ | ○○○ | ○○○ |

FROM FIG. 9D-1

| ... | ... | ... | ... | ... | ... | ... |
|---|---|---|---|---|---|---|
| 0368910452 | 1.304 | 750.00 | 20.00 | 2.00 | 3,750.00 | 50.00 |
| 0369210450 | 1.382 | 750.00 | 20.00 | 0.00 | 3,750.00 | 50.00 |
| 0368810450 | 1.382 | 375.00 | 10.00 | 2.00 | 1,875.00 | 25.00 |
| 0369210449 | 1.488 | 375.00 | 10.00 | 0.00 | 1,875.00 | 25.00 |
| 0369210451 | 1.488 | 750.00 | 20.00 | 1.00 | 3,750.00 | 50.00 |
| 0368810449 | 1.488 | 562.50 | 15.00 | 2.00 | 2,625.00 | 35.00 |
| 0368810451 | 1.488 | 1,125.00 | 30.00 | 10.00 | 5,625.00 | 75.00 |
| 0369010447 | 1.658 | 187.50 | 5.00 | 0.00 | 1,125.00 | 15.00 |
| 0369010453 | 1.658 | 937.50 | 25.00 | 1.00 | 4,500.00 | 60.00 |
| 0369210448 | 1.769 | 262.50 | 7.00 | 4.00 | 1,500.00 | 20.00 |
| 0369210452 | 1.769 | 562.50 | 15.00 | 0.00 | 2,625.00 | 35.00 |
| 0368810448 | 1.770 | 487.50 | 13.00 | 9.00 | 2,250.00 | 30.00 |
| 0368810452 | 1.770 | 150.00 | 4.00 | 3.00 | 750.00 | 10.00 |
| 0369110447 | 1.796 | 300.00 | 8.00 | 0.00 | 1,500.00 | 20.00 |
| 0369110453 | 1.796 | 1,125.00 | 30.00 | 7.00 | 5,625.00 | 75.00 |
| 0368910447 | 1.796 | 375.00 | 10.00 | 0.00 | 1,875.00 | 25.00 |
| 0368910453 | 1.796 | 937.50 | 25.00 | 6.00 | 4,875.00 | 65.00 |
| ... | ... | ... | ... | ... | ... | ... |
| TOTAL | | 350,000.00 | 7,000.00 | 1,325.00 | 1,425,000.00 | 24,750.00 |

FIG. 9E

METHOD 1: BASIC APPROXIMATION

$D = (X^2 + Y^2)^{0.5}$ $X = (LAT2 - LAT1)$
$Y = (LON2 - LON1)$

METHOD 2: BASIC APPROXIMATION WITH CONSTANT ADJUSTMENTS FOR MILES PER DEGREE LATITUDE AND LONGITUDE

$D = (X^2 + Y^2)^{0.5}$ $X = 69.1 * (LAT2 - LAT1)$
$Y = 53.0 * (LON2 - LON1)$ 69.1 = APPROXIMATE MILES PER DEGREE LATITUDE = 24,901.92 MILES (EARTH CIRCUMFERENCE AT EQUATOR)/360 DEGREES
        53.0 = APPROXIMATE MILES PER DEGREE LONGITUDE (AT 40 DEGRESS LATITUDE)

METHOD 3: BASIC APPROXIMATION WITH CONSTANT ADJUSTMENTS FOR MILES PER DEGREE LATITUDE AND VARYING ADJUSTMENT FOR MILES PER DEGREE LONGITUDE

$D = (X^2 + Y^2)^{0.5}$ $X = 69.1 * (LAT2 - LAT1)$
$Y = 69.1 * COS(LAT1 * \pi/180) * (LON2 - LON1)$ 69.1 = APPROXIMATE MILES PER DEGREE LATITUDE = 24,901.92 MILES (EARTH CIRCUMFERENCE AT EQUATOR)/360 DEGREES
        $69.1 * COS(LAT1 * \pi/180)$ = APPROXIMATE MILES PER DEGREE LONGITUDE ADJUSTED FOR LATITUDE

METHOD 4: GREAT CIRCLE DISTANCE FORMULA

$D = 69.1 * (180/\pi) * ARCCOS[SIN(LAT1 * \pi/180) SIN(LAT2 * \pi/180) + COS(LAT1 * \pi/180) COS(LAT2 * \pi/180) COS(LON2 * \pi/180 - LON1 * \pi/180)]$

FIG. 9F

| | 9F-1 |
|---|---|
| | 9F-2 |

FIG. 9F-1

| LOCATION | LATITUDE 1 | LONGITUDE 1 | DISTANCE METHOD | DISTANCE (IN MILES) BETWEEN LATITUDE/LONGITUDE 1 AND LATITUDE/LONGITUDE 2* | | | RING ASSIGNMENT BASED ON DISTANCE BETWEEN LATITUDE/LONGITUDE 1 AND LATITUDE/LONGITUDE 2* | | |
|---|---|---|---|---|---|---|---|---|---|
| | | | | 0.01 | 0.20 | 0.34 | 0.01 | 0.20 | 0.34 |
| ANCHORAGE, AK | 61.21 | -149.85 | 1 | 0.88 | 17.58 | 29.88 | 1 | 9 | 15 |
| | | | 2 | 0.87 | 17.42 | 29.61 | 1 | 9 | 15 |
| | | | 3 | 0.77 | 15.34 | 26.08 | 1 | 8 | 14 |
| | | | 4 | 0.77 | 15.33 | 26.05 | 1 | 8 | 14 |
| WAHALLA, ND | 48.92 | -97.92 | 1 | 0.88 | 17.58 | 29.88 | 1 | 9 | 15 |
| | | | 2 | 0.87 | 17.42 | 29.61 | 1 | 9 | 15 |
| | | | 3 | 0.83 | 16.54 | 28.11 | 1 | 9 | 15 |
| | | | 4 | 0.83 | 16.53 | 28.08 | 1 | 9 | 15 |
| DES MOINES, IA | 41.60 | -93.61 | 1 | 0.88 | 17.58 | 29.88 | 1 | 9 | 15 |
| | | | 2 | 0.87 | 17.42 | 29.61 | 1 | 9 | 15 |
| | | | 3 | 0.86 | 17.26 | 29.34 | 1 | 9 | 15 |
| | | | 4 | 0.86 | 17.25 | 29.31 | 1 | 9 | 15 |
| BLOOMINGTON, IL | 40.46 | -88.99 | 1 | 0.88 | 17.58 | 29.88 | 1 | 9 | 15 |
| | | | 2 | 0.87 | 17.42 | 29.61 | 1 | 9 | 15 |
| | | | 3 | 0.87 | 17.37 | 29.52 | 1 | 9 | 15 |
| | | | 4 | 0.87 | 17.36 | 29.49 | 1 | 9 | 15 |
| TULSA, OK | 36.13 | -95.99 | 1 | 0.88 | 17.58 | 29.88 | 1 | 9 | 15 |
| | | | 2 | 0.87 | 17.42 | 29.61 | 1 | 9 | 15 |
| | | | 3 | 0.89 | 17.76 | 30.20 | 1 | 9 | -- |
| | | | 4 | 0.89 | 17.76 | 30.17 | 1 | 9 | -- |

TO FIG. 9F-2

FROM FIG. 9F-1

| | | | | | | | | |
|---|---|---|---|---|---|---|---|---|
| ATLANTA, GA | 33.80 | -84.42 | 1 | 0.88 | 17.58 | 29.88 | 1 | 9 | 15 |
| | | | 2 | 0.87 | 17.42 | 29.61 | 1 | 9 | 15 |
| | | | 3 | 0.90 | 17.97 | 30.55 | 1 | 9 | -- |
| | | | 4 | 0.90 | 17.96 | 30.52 | 1 | 9 | -- |
| BROWNSVILLE, TX | 25.96 | -97.49 | 1 | 0.88 | 17.58 | 29.88 | 1 | 9 | 15 |
| | | | 2 | 0.87 | 17.42 | 29.61 | 1 | 9 | 15 |
| | | | 3 | 0.93 | 18.58 | 31.59 | 1 | 10 | -- |
| | | | 4 | 0.93 | 18.58 | 31.57 | 1 | 10 | -- |
| HONOLULU, HI | 21.31 | -157.82 | 1 | 0.88 | 17.58 | 29.88 | 1 | 9 | 15 |
| | | | 2 | 0.87 | 17.42 | 29.61 | 1 | 9 | 15 |
| | | | 3 | 0.94 | 18.89 | 32.11 | 1 | 10 | -- |
| | | | 4 | 0.94 | 18.88 | 32.09 | 1 | 10 | -- |

\* LATITUDE 2 AND LONGITUDE 2 ARE DERIVED BY ADDING THE DECIMAL AMOUNTS ABOVE TO LATITUDE 1 AND LONGITUDE 1

FIG. 9F-2

Figure 10A
Representative Distance Weighting Values

| GRID Ring * | Distance Weight |
|---|---|
| 0 | 1.000 |
| 1 | 1.000 |
| 2 | 1.000 |
| 3 | 1.000 |
| 4 | 1.000 |
| 5 | 1.000 |
| 6 | 1.000 |
| 7 | 1.000 |
| 8 | 1.000 |
| 9 | 0.995 |
| 10 | 0.995 |
| 11 | 0.995 |
| 12 | 0.990 |
| 13 | 0.990 |
| 14 | 0.990 |
| 15 | 0.985 |
| 16 | 0.980 |
| 17 | 0.970 |
| 18 | 0.955 |
| 19 | 0.935 |
| 20 | 0.915 |
| 21 | 0.885 |
| 22 | 0.850 |
| 23 | 0.800 |
| 24 | 0.750 |
| 25 | 0.675 |
| 26 | 0.575 |
| 27 | 0.475 |
| 28 | 0.350 |
| 29 | 0.200 |
| 30 | 0.050 |

\* GRID rings are a collection of GRID cells with similar distance from a target GRID cell. Larger ring assignments represent further distances from the target GRID cell.

FIG. 10B

| | 10B-1 |
|---|---|
| | 10B-2 |
| | 10B-3 | 10B-4 |
| | 10B-5 |

FIG. 10B-1

| | NON-CATASTROPHE FIRE PERIL | GRID CELL EXPERIENCE AREA | STATEWIDE | DESCRIPTION |
|---|---|---|---|---|
| (1) | NON-CATASTROPHE LOSS AND ALAE COMMON RISK EXPOSURE | 10,000,000.00 | 200,000,000.00 | EXPOSURE * PERIL EXPOSURE ADJUSTMENT |
| (2) | NON-CATASTROPHE LOSS AND ALAE COMMON RISK EXPOSURE | 156,724.05 | 2,750,000.00 | |
| (3) | NON-CATASTROPHE LOSS AND ALAE/COMMON RISK EXPOSURE | 63.81 | 72.73 | (1) / (2) |
| (4) | CAPPED NON-CATASTROPHE LOSS AND ALAE/COMMON RISK EXPOSURE | 63.81 | 72.73 | (3) LIMITED TO 4 * SW(3) |
| (5) | CREDIBILITY STANDARD | 1,250 | | BASED ON 90% CONFIDENCE INTERVAL AND 15% ERROR |
| (6) | NON-CATASTROPHE CLAIMS | 150 | | |
| (7) | CREDIBILITY | 0.346 | | MINIMUM{[(6) / (5)] ^ [0.5], 1.000} |
| (8) | MODELED NON-CATASTROPHE LOSS AND ALAE RELATIVITY | 1.100 | 1.000 | |
| (9) | MODELED NON-CATASTROPHE LOSS AND ALAE/COMMON RISK EXPOSURE | 80.00 | 72.73 | (8) * SW(4) |
| (10) | EXPECTED NON-CATASTROPHE LOSS AND ALAE/COMMON RISK EXPOSURE | 74.39 | 72.73 | (4) * (7) + (9) * [1 − (7)] |
| (11) | RELATIVE TO STATEWIDE | 1.023 | 1.000 | (10) / SW(10) |

FIG. 10B-2

| | NON-CATASTROPHE CRIME PERIL | GRID CELL EXPERIENCE AREA | STATEWIDE | DESCRIPTION |
|---|---|---|---|---|
| (12) | NON-CATASTROPHE LOSS AND ALAE | 1,750,000.00 | 50,000,000.00 | EXPOSURE * PERIL EXPOSURE ADJUSTMENT |
| (13) | COMMON RISK EXPOSURE | 148,750.00 | 2,750,000.00 | |
| (14) | NON-CATASTROPHE LOSS AND ALAE/COMMON RISK EXPOSURE | 11.76 | 18.18 | (12) / (13) |
| (15) | CAPPED NON-CATASTROPHE LOSS AND ALAE/COMMON RISK EXPOSURE | 11.76 | 18.18 | (14) LIMITED TO 4 * SW(14) |
| (16) | CREDIBILITY STANDARD | 500 | | BASED ON 90% CONFIDENCE INTERVAL AND 15% ERROR |
| (17) | NON-CATASTROPHE CLAIMS | 475 | | |
| (18) | CREDIBILITY | 0.975 | | MINIMUM{[(17) / (16)] ^ [0.5], 1.000} |
| (19) | EXPECTED NON-CATASTROPHE LOSS AND ALAE/COMMON RISK EXPOSURE | 11.92 | 18.18 | (15) * (18) + SW(15) * [1 - (18)] |
| (20) | RELATIVE TO STATEWIDE | 0.656 | 1.000 | (19) / SW(19) |

FIG. 10B-3

| | NON-CATASTROPHE OEC PERIL | GRID CELL EXPERIENCE AREA | STATEWIDE | DESCRIPTION |
|---|---|---|---|---|
| (21) | NON-CATASTROPHE LOSS AND ALAE | 7,475,000.00 | 125,000,000.00 | EXPOSURE * PERIL EXPOSURE ADJUSTMENT |
| (22) | COMMON RISK EXPOSURE | 149,500.00 | 2,750,000.00 | |
| (23) | NON-CATASTROPHE LOSS AND ALAE/COMMON RISK EXPOSURE | 50.00 | 45.45 | (21) / (22) |
| (24) | CAPPED NON-CATASTROPHE LOSS AND ALAE/COMMON RISK EXPOSURE | 50.00 | 45.45 | (23) LIMITED TO 4 * SW(23) |
| (25) | CREDIBILITY STANDARD | 800 | | |
| (26) | NON-CATASTROPHE CLAIMS | 375 | | BASED ON 90% CONFIDENCE INTERVAL AND 15% ERROR |
| (27) | CREDIBILITY | 0.685 | | MINIMUM{[(26) / (25)] ^ [0.5], 1.000} |
| (28) | EXPECTED NON-CATASTROPHE LOSS AND ALAE/COMMON RISK EXPOSURE | 48.57 | 45.45 | (24) * (27) + SW(24) * [1 - (27)] |
| (29) | RELATIVE TO STATEWIDE | 1.069 | 1.000 | (28) / SW(28) |

| | NON-CATASTROPHE WIND/HAIL PERIL | GRID CELL EXPERIENCE AREA | STATEWIDE | DESCRIPTION |
|---|---|---|---|---|
| (30) | EXPECTED NON-HURRICANE NON-CATASTROPHE LOSS AND ALAE/AIY | 0.5850 | 0.6000 | |
| (31) | LATEST YEAR STATEWIDE AIY/LATEST YEAR STATEWIDE COMMON RISK EXPOSURE | 250.000 | 250.000 | |
| (32) | EXPECTED NON-HURRICANE NON-CATASTROPHE LOSS AND ALAE/COMMON RISK EXPOSURE | 146.25 | 150.00 | (30) * (31) |
| (33) | RELATIVE TO STATEWIDE | 0.975 | 1.000 | (32) / SW(32) |

FIG. 10B-4

| | NON-CATASTROPHE LIABILITY PERIL | GRID CELL EXPERIENCE AREA | STATEWIDE | DESCRIPTION |
|---|---|---|---|---|
| (34) | NON-CATASTROPHE LOSS AND ALAE | | 58,750,500.00 | |
| (35) | COMMON RISK EXPOSURE | | 2,750,000.00 | |
| (36) | NON-CATASTROPHE LOSS AND ALAE/COMMON RISK EXPOSURE | 21.36 | 21.36 | (34) / (35) |
| (37) | EXPECTED NON-CATASTROPHE LOSS AND ALAE/COMMON RISK EXPOSURE | 21.36 | 21.36 | SW(36) |
| (38) | RELATIVE TO STATEWIDE | 1.000 | 1.000 | (37) / SW(37) |

FIG. 10B-5

| | | GRID CELL EXPERIENCE AREA | STATEWIDE | DESCRIPTION |
|---|---|---|---|---|
| (39) | ALL PERIL EXPECTED NON-HURRICANE NON-CATASTROPHE LOSS AND ALAE/COMMON RISK EXPOSURE | 302.49 | 307.72 | (10) + (19) + (28) + (32) + (37) |
| (40) | ULAE FACTOR | 1.08 | 1.08 | STATEWIDE NON-CATASTROPHE ULAE/STATEWIDE NON-CATASTROPHE LOSS AND ALAE |
| (41) | ALL PERIL EXPECTED NON-HURRICANE NON-CATASTROPHE LOSS AND LAE/COMMON RISK EXPOSURE | 326.69 | 332.34 | (39) * (40) |
| (42) | EXPECTED NON-HURRICANE CATASTROPHE LOSS AND LAE/AIY | 0.3850 | 0.4000 | |
| (43) | EXPECTED HURRICANE CATASTROPHE LOSS AND LAE/AIY | 0.0000 | 0.0000 | |
| (44) | LATEST YEAR STATEWIDE AIY/LATEST YEAR STATEWIDE COMMON RISK EXPOSURE | 250.000 | 250.000 | |
| (45) | CATASTROPHE LOSS AND LAE/COMMON RISK EXPOSURE | 96.25 | 100.00 | [(42) + (43)] * (44) |
| (46) | TOTAL EXPECTED LOSS AND LAE/COMMON RISK EXPOSURE | 422.94 | 432.34 | (41) + (45) |
| (47) | RELATIVE TO STATEWIDE | 0.978 | 1.000 | (46) / SW(46) |
| (48) | EXPENSE FLATTENING PROVISION | 0.150 | 0.150 | |
| (49) | EXPENSE FLATTENED FACTOR | 0.982 | 1.000 | (47) * [1 - (48)] + (48) |
| (50) | INDICATED FACTOR | 0.982 | 0.965 | (49); SW(50) = EXPOSURE WEIGHTED AVERAGE (49) OVER ALL GRID CELLS |
| (51) | BALANCED INDICATED FACTOR | 1.018 | 1.000 | (50) / SW(50) |
| (52) | AVERAGE PRESENT FACTOR | 1.050 | 1.000 | |
| (53) | BALANCED INDICATED CHANGE | -3.1% | 0.0% | (51) / (52) - 1 |

FIG. 10C

| 10C-1 |
|-------|
| 10C-2 |

| RING ASSIGNMENT (1) | DISTANCE WEIGHT | PERIL NON-CATASTROPHE CAUSE COUNTS (2) | PERIL NON-CATASTROPHE CAUSE COUNTS USED (3) | DISTANCE WEIGHTED NON-CATASTROPHE CAUSE COUNTS USED (4) |
|---|---|---|---|---|
| 0 | 1.0000 | 2 | 2 | 2 |
| 1 | 1.0000 | 5 | 5 | 5 |
| 2 | 1.0000 | 10 | 10 | 10 |
| 3 | 1.0000 | 13 | 13 | 13 |
| 4 | 1.0000 | 15 | 15 | 15 |
| 5 | 1.0000 | 10 | 10 | 10 |
| 6 | 1.0000 | 25 | 25 | 25 |
| 7 | 1.0000 | 20 | 20 | 20 |
| 8 | 1.0000 | 25 | 25 | 25 |
| 9 | 0.9950 | 25 | 25 | 25 |
| TOTAL | | 150 | 150 | 150 |

| RING ASSIGNMENT | PERIL LOSS AND ALAE EXPERIENCE PERIOD EXPOSURE (5) | PERIL LOSS AND ALAE EXPERIENCE PERIOD COMMON RISK EXPOSURE (6) | PERIL NON-CATASTROPHE LOSS AND ALAE (7) |
|---|---|---|---|
| 0 | 50.00 | 60.75 | 130,000.00 |
| 1 | 1,160.00 | 1,314.69 | 325,000.00 |
| 2 | 4,695.00 | 4,808.86 | 650,000.00 |
| 3 | 10,500.00 | 10,500.00 | 845,000.00 |
| 4 | 12,595.00 | 13,024.75 | 975,000.00 |
| 5 | 15,000.00 | 15,350.00 | 650,000.00 |
| 6 | 18,500.00 | 19,125.00 | 1,625,000.00 |
| 7 | 21,000.00 | 22,240.00 | 1,350,000.00 |
| 8 | 24,500.00 | 25,760.00 | 1,625,000.00 |
| 9 | 42,000.00 | 44,540.00 | 1,825,000.00 |
| TOTAL | 150,000.00 | 156,724.05 | 10,000,000.00 |

| | (8) | (9) | (10) |
|---|---|---|---|
| | ADJUSTED DATA | | |
| RING ASSIGNMENT | PERIL LOSS AND ALAE EXPERIENCE PERIOD EXPOSURE | PERIL LOSS AND ALAE EXPERIENCE PERIOD COMMON RISK EXPOSURE | PERIL NON-CATASTROPHE LOSS AND ALAE |
| 0 | 50.00 | 60.75 | 130,000.00 |
| 1 | 1,160.00 | 1,314.69 | 325,000.00 |
| 2 | 4,695.00 | 4,808.86 | 650,000.00 |
| 3 | 10,500.00 | 10,500.00 | 845,000.00 |
| 4 | 12,595.00 | 13,024.75 | 975,000.00 |
| 5 | 15,000.00 | 15,350.00 | 650,000.00 |
| 6 | 18,500.00 | 19,125.00 | 1,625,000.00 |
| 7 | 21,000.00 | 22,240.00 | 1,350,000.00 |
| 8 | 24,500.00 | 25,760.00 | 1,625,000.00 |
| 9 | 42,000.00 | 44,540.00 | 1,825,000.00 |
| TOTAL | 150,000.00 | 156,724.05 | 10,000,000.00 |

(3) ACTUAL CLAIMS IN THE OUTER MOST RING ARE LIMITED SUCH THAT THE TOTAL CLAIMS USED DOES NOT EXCEED THE NUMBER OF CLAIMS AT THE SELECTED MAXIMUM CREDIBILITY
(8) (5) * (4) / (2)
(9) (6) * (4) / (2)
(10) (7) * (4) / (2)

FIG. 10D

| 10D-1 |
|---|
| 10D-2 |

FIG. 10D-1

| GRID CELL | DISTANCE FROM TARGET GRID CELL (MILES) | GRID RING | PERIL LOSS AND ALAE EXPERIENCE PERIOD EXPOSURE | PERIL EXPOSURE ADJUSTMENT | PERIL LOSS AND ALAE EXPERIENCE PERIOD COMMON RISK EXPOSURE | PERIL NON-CATASTROPHE CAUSE COUNTS | PERIL NON-CATASTROPHE LOSS AND ALAE |
|---|---|---|---|---|---|---|---|
| 0369010450 | 0.000 | 0 | 50.00 | 1.22 | 60.75 | 2.00 | 130,000.00 |
| 0369010449 | 0.553 | 1 | 200.00 | 1.10 | 220.60 | 0.00 | 0.00 |
| 0369010451 | 0.553 | 1 | 45.00 | 1.24 | 55.89 | 0.00 | 0.00 |
| 0369110450 | 0.691 | 1 | 175.00 | 1.04 | 182.53 | 1.00 | 65,000.00 |
| 0368910450 | 0.691 | 1 | 225.00 | 1.20 | 269.78 | 0.00 | 0.00 |
| 0369110449 | 0.885 | 1 | 50.00 | 1.25 | 62.40 | 0.00 | 0.00 |
| 0369110451 | 0.885 | 1 | 90.00 | 1.00 | 90.00 | 0.00 | 0.00 |
| 0368910449 | 0.885 | 1 | 300.00 | 1.07 | 321.00 | 4.00 | 260,000.00 |
| 0368910451 | 0.885 | 1 | 75.00 | 1.50 | 112.50 | 0.00 | 0.00 |
| 0369010448 | 1.105 | 2 | 90.00 | 1.24 | 111.42 | 0.00 | 0.00 |
| 0369010452 | 1.105 | 2 | 250.00 | 1.01 | 252.50 | 1.00 | 65,000.00 |
| 0369110448 | 1.303 | 2 | 400.00 | 1.05 | 420.00 | 0.00 | 0.00 |
| 0369110452 | 1.303 | 2 | 475.00 | 1.02 | 484.50 | 1.00 | 65,000.00 |
| 0368910448 | 1.304 | 2 | 145.00 | 0.95 | 137.75 | 0.00 | 0.00 |
| ○○○ | ○○○ | ○○○ | ○○○ | ○○○ | ○○○ | ○○○ | ○○○ |

FROM FIG. 10D-1

| ○ ○ ○ | ○ ○ ○ | ○ ○ ○ | ○ ○ ○ | ○ ○ ○ | ○ ○ ○ | ○ ○ ○ |
|---|---|---|---|---|---|---|
| 0368910452 | 1.304 | 2 | 200.00 | 1.23 | 246.80 | 0.00 | 0.00 |
| 0369210450 | 1.382 | 2 | 375.00 | 0.90 | 337.50 | 0.00 | 0.00 |
| 0368810450 | 1.382 | 2 | 125.00 | 1.23 | 153.75 | 0.00 | 0.00 |
| 0369210449 | 1.488 | 2 | 100.00 | 0.90 | 90.00 | 0.00 | 0.00 |
| 0369210451 | 1.488 | 2 | 175.00 | 1.06 | 185.68 | 0.00 | 0.00 |
| 0369210449 | 1.488 | 2 | 140.00 | 1.10 | 154.00 | 0.00 | 0.00 |
| 0368810451 | 1.488 | 2 | 115.00 | 1.15 | 132.25 | 1.00 | 65,000.00 |
| 0369010447 | 1.658 | 2 | 150.00 | 1.05 | 157.50 | 2.00 | 130,000.00 |
| 0369010453 | 1.658 | 2 | 325.00 | 1.00 | 324.35 | 1.00 | 65,000.00 |
| 0369210448 | 1.769 | 2 | 280.00 | 1.19 | 332.64 | 0.00 | 0.00 |
| 0369210452 | 1.769 | 2 | 150.00 | 0.97 | 145.50 | 1.00 | 65,000.00 |
| 0368810448 | 1.770 | 2 | 10.00 | 0.95 | 9.50 | 2.00 | 130,000.00 |
| 0368810452 | 1.770 | 2 | 375.00 | 0.90 | 337.50 | 0.00 | 0.00 |
| 0369110447 | 1.796 | 2 | 90.00 | 0.93 | 83.70 | 0.00 | 0.00 |
| 0369110453 | 1.796 | 2 | 225.00 | 0.90 | 201.83 | 0.00 | 0.00 |
| 0368910447 | 1.796 | 2 | 150.00 | 0.97 | 145.50 | 0.00 | 0.00 |
| 0368910453 | 1.796 | 2 | 350.00 | 1.04 | 364.70 | 1.00 | 65,000.00 |
| ○ ○ ○ | ○ ○ ○ | ○ ○ ○ | ○ ○ ○ | | ○ ○ ○ | ○ ○ ○ | ○ ○ ○ |
| TOTAL | | | 150,000.00 | | 155,724.05 | 150.00 | 10,000,000.00 |

Figure 10E
Methods to Calculate Distance between Two Latitude/Longitude Coordinates

Method 1: Basic Approximation

D = $(X^2 + Y^2)^{0.5}$

X = (LAT2 - LAT1)
Y = (LON2 - LON1)

Method 2: Basic Approximation with Constant Adjustments for Miles per Degree Latitude and Longitude

D = $(X^2 + Y^2)^{0.5}$

X = 69.1 * (LAT2 - LAT1)
Y = 53.0 * (LON2 - LON1)

69.1 = approximate miles per degree latitude = 24,901.92 miles (earth circumference at equator) / 360 degrees
    53.0 = approximate miles per degree longitude (at 40 degrees latitude)

Method 3: Basic Approximation with Constant Adjustment for Miles per Degree Latitude and Varying Adjustment for Miles per Degree Longitude

D = $(X^2 + Y^2)^{0.5}$

X = 69.1 * (LAT2 - LAT1)
Y = 69.1 * COS(LAT1 * π / 180) * (LON2 - LON1)

69.1 = approximate miles per degree latitude = 24,901.92 miles (earth circumference at equator) / 360 degrees
    69.1 * COS(LAT1 * π / 180) = approximate miles per degree longitude adjusted for latitude

Method 4: Great Circle Distance Formula

D = 69.1 * (180 / π) * ARCCOS[SIN(LAT1 * π / 180)SIN(LAT2 * π / 180) + COS(LAT1 * π / 180)COS(LAT2 * π / 180)COS(LON2 * π / 180 - LON1 * π / 180)]

FIG. 10F

| 10F-1 |
|-------|
| 10F-2 |

FIG. 10F-1

| LOCATION | LATITUDE 1 | LONGITUDE 1 | DISTANCE METHOD | DISTANCE (IN MILES) BETWEEN LATITUDE/LONGITUDE 1 AND LATITUDE/LONGITUDE 2* | | | | RING ASSIGNMENT BASED ON DISTANCE BETWEEN LATITUDE/LONGITUDE 1 AND LATITUDE/LONGITUDE 2* | | | |
|---|---|---|---|---|---|---|---|---|---|---|---|
| | | | | 0.01 | 0.20 | 0.34 | | 0.01 | 0.20 | | 0.34 |
| ANCHORAGE, AK | 61.21 | -149.85 | 1 | 0.88 | 17.58 | 29.88 | | 1 | 9 | | 15 |
| | | | 2 | 0.87 | 17.42 | 29.61 | | 1 | 9 | | 15 |
| | | | 3 | 0.77 | 15.34 | 26.08 | | 1 | 8 | | 14 |
| | | | 4 | 0.77 | 15.33 | 26.05 | | 1 | 8 | | 14 |
| WAHALLA, ND | 48.92 | -97.92 | 1 | 0.88 | 17.58 | 29.88 | | 1 | 9 | | 15 |
| | | | 2 | 0.87 | 17.42 | 29.61 | | 1 | 9 | | 15 |
| | | | 3 | 0.83 | 16.54 | 28.11 | | 1 | 9 | | 15 |
| | | | 4 | 0.83 | 16.53 | 28.08 | | 1 | 9 | | 15 |
| DES MOINES, IA | 41.60 | -93.61 | 1 | 0.88 | 17.58 | 29.88 | | 1 | 9 | | 15 |
| | | | 2 | 0.87 | 17.42 | 29.61 | | 1 | 9 | | 15 |
| | | | 3 | 0.86 | 17.26 | 29.34 | | 1 | 9 | | 15 |
| | | | 4 | 0.86 | 17.25 | 29.31 | | 1 | 9 | | 15 |
| BLOOMINGTON, IL | 40.46 | -88.99 | 1 | 0.88 | 17.58 | 29.88 | | 1 | 9 | | 15 |
| | | | 2 | 0.87 | 17.42 | 29.61 | | 1 | 9 | | 15 |
| | | | 3 | 0.87 | 17.37 | 29.52 | | 1 | 9 | | 15 |
| | | | 4 | 0.87 | 17.36 | 29.49 | | 1 | 9 | | 15 |
| TULSA, OK | 36.13 | -95.99 | 1 | 0.88 | 17.58 | 29.88 | | 1 | 9 | | 15 |
| | | | 2 | 0.87 | 17.42 | 29.61 | | 1 | 9 | | 15 |
| | | | 3 | 0.89 | 17.76 | 30.20 | | 1 | 9 | | -- |
| | | | 4 | 0.89 | 17.76 | 30.17 | | 1 | 9 | | -- |

TO FIG. 10F-2

FROM FIG. 10F-1

| | | | | | | | | | |
|---|---|---|---|---|---|---|---|---|---|
| ATLANTA, GA | 33.80 | -84.42 | 1 | 0.88 | 17.58 | 29.88 | 1 | 9 | 15 |
| | | | 2 | 0.87 | 17.42 | 29.61 | 1 | 9 | 15 |
| | | | 3 | 0.90 | 17.97 | 30.55 | 1 | 9 | --- |
| | | | 4 | 0.90 | 17.96 | 30.52 | 1 | 9 | --- |
| BROWNSVILLE, TX | 25.96 | -97.49 | 1 | 0.88 | 17.58 | 29.88 | 1 | 9 | 15 |
| | | | 2 | 0.87 | 17.42 | 29.61 | 1 | 9 | 15 |
| | | | 3 | 0.93 | 18.58 | 31.59 | 1 | 10 | --- |
| | | | 4 | 0.93 | 18.58 | 31.57 | 1 | 10 | --- |
| HONOLULU, HI | 21.31 | -157.82 | 1 | 0.88 | 17.58 | 29.88 | 1 | 9 | 15 |
| | | | 2 | 0.87 | 17.42 | 29.61 | 1 | 9 | 15 |
| | | | 3 | 0.94 | 18.89 | 32.11 | 1 | 10 | --- |
| | | | 4 | 0.94 | 18.88 | 32.09 | 1 | 10 | --- |

* LATITUDE 2 AND LONGITUDE 2 ARE DERIVED BY ADDING THE DECIMAL AMOUNTS ABOVE TO LATITUDE 1 AND LONGITUDE 1

FIG. 10F-2

COMPUTER READABLE MEDIUM CONTAINING A SET OF COMPUTER READABLE INSTRUCTIONS FOR GRID-BASED INSURANCE RATING

CROSS-REFERENCE TO RELATED APPLICATIONS

This application is a Divisional of U.S. patent application Ser. No. 13/226,785 filed Sep. 7, 2011, which claims priority to U.S. Provisional Patent Application No. 61/381,885, filed on Sep. 10, 2010. The contents of which are incorporated herein by reference in there entirety.

TECHNICAL FIELD

The present disclosure relates generally to systems and methods for rating an insurance product. These rating systems and methods may utilize computer, hardware, software, and data stores to gather and process data from grid locations near to a location of interest.

BACKGROUND

Insurance rating is the process of assessing the value of a given risk, and in turn pricing a policy to protect against that risk. Fundamentally, insurance premiums are designed to reflect the amount of a payout should a covered event occur in view of the likelihood of the occurrence of that event. The process of determining the cost of an insurance policy is called rating. The rating process may include a number of variables, including experience data for a specific insured, experience data for a class of insured entities, capital investment predictions, profit margin targets, and a wide variety of other data useful for predicting the occurrence of certain real-world events as well as the amount of damage likely to result from such events.

Further, experience rating involves analyzing past claims experience to determine a prospective premium amount and/or a retrospective premium adjustment. See, e.g., P. Booth, *Modern Actuarial Theory and Practice,* 340-51 (Chapman & Hall/CRC 1999). For example, a business may operate a large fleet of vehicles. And, that business may seek to insure the vehicles to cover property damage and to cover possible personal injury claims if a fleet vehicle were to be in an accident with another vehicle. If the fleet is large enough or the business has been operating the fleet long enough, there may be enough historical data to reliably and accurately estimate the expected claims for the next year. That estimate (possibly combined with an allocation of expenses or assessment of an administrative fee) would represent the insurance premium in an ideal scenario. At the end of the annual policy term, a surcharge or refund may also be appropriate if the actual claims for the term were higher or lower than the estimated claims amount.

A typical family seeking automobile insurance cannot, however, produce anywhere near the amount of data needed to make a reliable and accurate estimate of anticipated claims for their vehicle or vehicles. Thus, insurance companies must rate personal policies in a risk pool of comparable policies to produce enough data to make such an estimate. One mechanism for doing this is to assess what data is available for the family (e.g., demographic information, types of vehicles, and what limited claim information is available) and use that data to assign an appropriate pool to the family.

The myriad types of data available to an insurer for performing the rating process are often associated with geographic locations or regions. However, this association is not consistent or uniform. Some property crime data is associated with a "block" of addresses on a city street, e.g., 300-400 block of Main Street. Flood zone data and land elevation data may be stored as complex topographic maps. Loss experience data may be associated with a coordinate pair representing the longitude and latitude of the location of the loss event.

At present, insurance rating requires a complex search process to compile relevant data for input into a rating function. For example, a policy to be rated may be associated with a specific location, e.g., a street address of a home or office or the location where a vehicle will be parked at night. To rate a policy for that location, some subset of the relevant data must be gathered and provided to a rating algorithm. The gathering process is often computationally difficult in view of the inconsistent and non-uniform associations of data to geography discussed above. In some instances, data is processed and aggregated by county, city, and/or postal ZIP code. This aggregation is made difficult by the nearly arbitrary boundaries defined by county lines, city limits, and ZIP codes. Further, county, city, and postal ZIP code boundaries may change over time. In other instances, data is processed by aggregated sales territory.

Rates appropriate to each area are generally determined based on the associated historical claims experience. While existing methods of territorial rating have served insurance providers well, these approaches can be problematic for several reasons: (1) geographic boundaries can change, as discussed above; (2) geographic areas may be larger than desired; (3) population may not be equally distributed within these geographic areas; and (4) historical claim experience within these geographic areas may be limited.

SUMMARY

In accordance with the teachings of the present disclosure, disadvantages, and problems associated with existing insurance rating systems have been reduced.

According to one aspect of the invention, there is provided a method for rating insurance products using a programmed computer system. The method comprises receiving a coordinate pair comprising a longitude and a latitude of a location; determining a target coordinate grid block bounded by latitude and longitude lines, wherein the coordinate grid block encompasses the coordinate pair; querying a database for a target set of existing data associated with the target coordinate grid block, wherein the existing data was associated with the target coordinate grid block prior to receiving the coordinate pair; and calculating a pure premium based at least in part on analyzing the data in the target set.

According to another aspect of the invention, there is provided a method for rating insurance products using a programmed computer system. The method comprises receiving a coordinate pair comprising a longitude and a latitude of a location; determining a target coordinate grid block by truncating a decimal representation of the longitude and latitude of the location; querying a database for a first set of existing data associated with the target coordinate grid block, wherein the existing data was associated with the target coordinate grid block prior to receiving the coordinate pair; setting a ring counter to an initial value; determining a current ring of coordinate grid blocks grid adjacent to and surrounding the target grid block; querying the database for a second set of existing data associated with each coordinate grid block in the current ring of coordinate grid blocks; and calculating a pure premium based on constant values and an analysis of the data in the first set and the second set.

According to a further aspect of the invention, there is provided a computer system for rating insurance products. The computer system comprises a processor, a memory, and a set of computer readable instructions stored in the memory. When executed by the processor, the computer readable instructions configured to receive a coordinate pair including a longitude and a latitude of a location; determine a coordinate grid block bounded by latitude and longitude lines, which grid block is associated with the coordinate pair; query a database for a plurality of existing data associated with the coordinate grid block; and calculate a pure premium based at least in part on the plurality of existing data.

According to yet another aspect of the invention, there is provided a computer system for rating insurance products comprising a processor, a memory, an input for receiving a coordinate pair including a longitude and a latitude of a location, a grid block determination means for determining a coordinate grid block bounded by latitude and longitude lines, which grid block is associated with the coordinate pair; an input for receiving database query results from a database comprising a plurality of existing data associated with the coordinate grid block; and a rating means for determining a rate based at least in part on the plurality of existing data.

According to still another aspect of the invention, there is provided a computer readable medium containing a set of computer readable instructions to be loaded into a computer. When those instructions are loaded into a computer, they configure that computer to receive demographic data, fire station data, or other data associated with a location; receive a coordinate pair including a longitude and latitude of a location; determine a coordinate grid block bounded by latitude and longitude lines, which grid block is associated with the coordinate pair; query a database for a plurality of existing data associated with the coordinate grid block; and determine a rate based at least in part on the plurality of existing data and the demographic data, fire station data, or other data associated with a location.

According to yet another aspect of the invention, there is provided a method for rating insurance products using a programmed computer system. The method comprises receiving a coordinate pair comprising a longitude and a latitude of a location; determining a target coordinate grid block bounded by latitude and longitude lines, which grid block is associated with the coordinate pair; querying a database for a first set of existing data associated with the target coordinate grid block, wherein the existing data was associated with the target coordinate grid block prior to receiving the coordinate pair; querying a database for a second set of existing data associated with a regulator, which regulates insurance policies in a geographic area comprising the location; and calculating a pure premium based on constant values and an analysis of the data in the first set and the second set.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 9A provides representative GRID distance weighting values, for an automobile example.

FIG. 9B provides an overview of the methodology for an automobile example.

FIG. 9C provides the GRID ring level data for an automobile example.

FIG. 9D provides the GRID cell level data for an automobile example.

FIG. 9E provides methodologies for calculating distance between two latitude and longitude coordinate pairs in an automobile example.

FIG. 9F provides the results of the distance calculations for an automobile example.

FIG. 10A provides representative GRID distance weighting values, for a homeowner's policy example.

FIG. 10B provides an overview of the methodology for a homeowner's policy example.

FIG. 10C provides the GRID ring level data for a homeowner's policy example.

FIG. 10D provides the GRID cell level data for a homeowner's policy example.

FIG. 10E provides methodologies for calculating distance between two latitude and longitude coordinate pairs in a homeowner's example.

FIG. 10F provides the results of the distance calculations for a homeowner's example.

DETAILED DESCRIPTION

Figure 1:
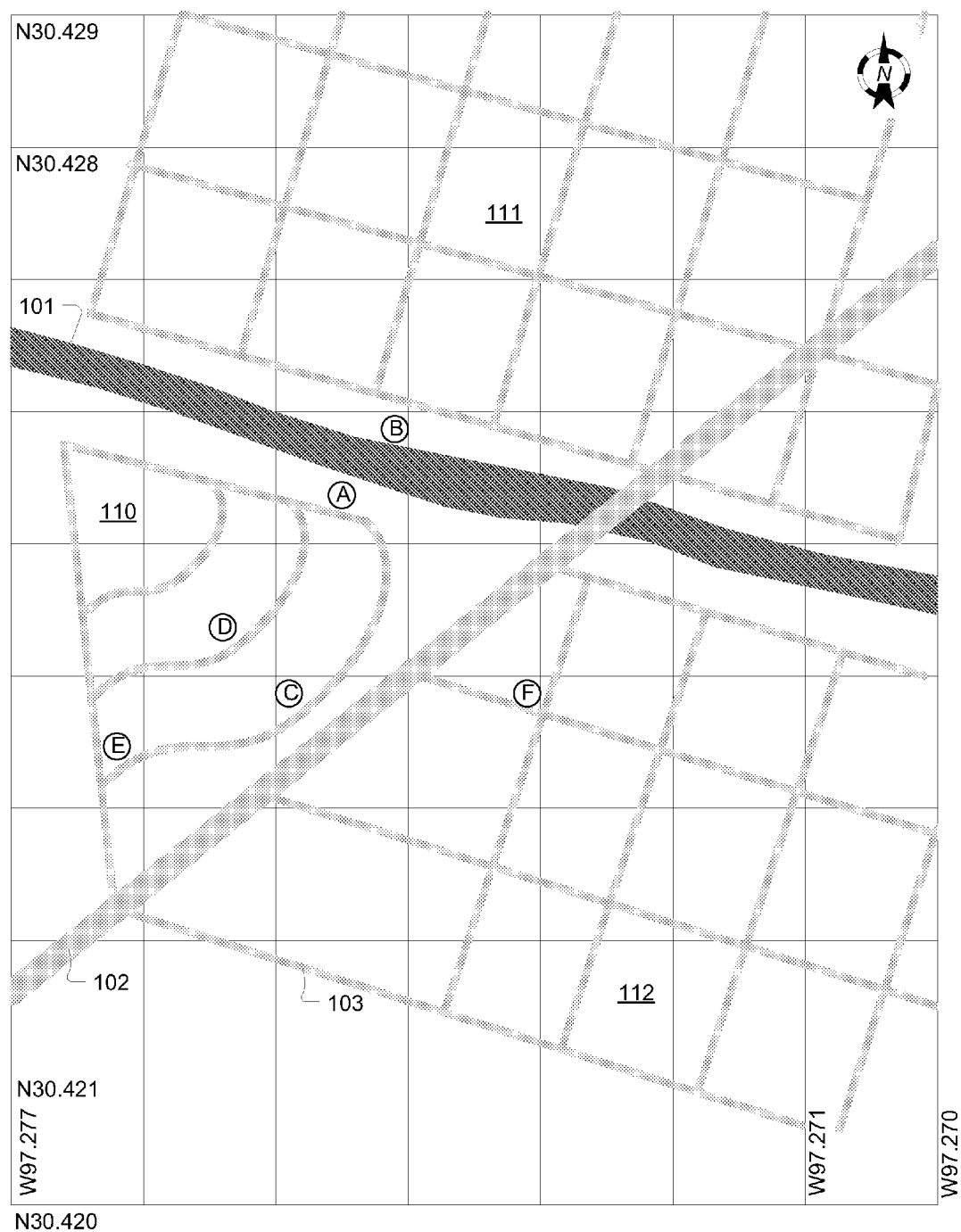
FIG. 1 illustrates a stylized town map overlaid with a coordinate grid, according to certain embodiments of the present disclosure.

Preferred embodiments and their advantages over the prior art are best understood by reference to FIGS. 1-11 below. However, the present disclosure may be more easily understood in the context of a high level description of certain embodiments.

As discussed in the BACKGROUND, insurance risks are often rated based on data relevant to one or more particular geographic locations. For example, a homeowner's policy or commercial fire policy covers certain risks to a physical structure at an identified geographic location. The risks associated with that geographic location may or may not be different than the risks associated with any other location. In one illustrative example, the risk of fire may be lower in a neighborhood of brick homes than in a neighborhood of wooden homes. This lower risk may represent a lower incidence of damage due to fire and/or a lower typical claim amount resulting from previous fires in that neighborhood. In another example, an automobile policy may represent a risk that varies relative to the location where a car is parked at night and/or during the day. If the car is parked on the street in an urban neighborhood, the risk of damage may be significantly higher than if it is parked in a secure garage. For the purposes of this disclosure, the term target location will be used to reference a specific geographic location relevant to rating of a specific covered risk. In some circumstances, there may be multiple relevant geographic locations (e.g., a garage location and a work location for an automobile), but the present disclosure will treat each location independently for the sake of clarity.

One aspect of the invention is to define territories based on latitude and longitude coordinates. This method allows insurance providers to more finely segment policy pricing based on geographic characteristics and provides more pricing points than current structures. For purposes of this application, the system is called Geographic Rating Identification (GRID) Based Rating and utilizes latitude and longitude coordinates to determine the Location Rating Factors (LRFs) that may apply to a policy. The GRIDs may be set up so that the individual target cells are not equal in size according to area. Rather, the latitudinal and longitudinal coordinates may be truncated at varying precisions to provide individual target cells of different sizes according to area. For example, in urban, populated areas, the GRID may be smaller, while in rural, less populated areas the GRIDs may be much larger. Once the GRIDs are established, then individual policies may be quickly assigned to GRIDs by looking up the latitudinal and longitudinal coordinates of the associated location address. Truncation of the latitudinal and longitudinal coordinates may provide for a much quicker lookup functionality.

Latitude and longitude coordinates for particular address locations may be obtained via a geocoding process or service, wherein the latitude and longitude coordinates are provided with a precision to the sixth decimal place for both values along with codes indicating the quality of the result. Results at that level of precision identify a geographic point at the sub-inch level.

Latitude and longitude coordinates may be used to define a coordinate system using four defined corners and developing a database table and lookup methodology, wherein each GRID cell area is of similar geographic size. The complexity of the queries required to retrieve results from the developed tables makes this solution less preferred.

Alternatively, a database function may be used to group geographically like risks. Typically, these areas are not equal in geographic size. The grouping may use a single database function to provide significantly faster results. This method also could be easily integrated with existing database systems used for the rating process and can more easily connect the pieces to form a countrywide map.

According to a further alternative, latitude and longitude coordinates are used to define GRID cells of different sizes. Because the latitude and longitude coordinates provide precision to the sixth decimal place, larger GRID cells may be defined by truncating the latitude and longitude coordinates to fewer decimal places. Thus a single database may accommodate variable GRID cell sizes wherein larger GRID cells are defined by latitude and longitude coordinates that have fewer decimal places and smaller GRID cells are defined by latitude and longitude coordinates that have more decimal places.

Some benefits of GRID Based Rating include: (1) latitude and longitude coordinates are fixed and do not change over time (unlike ZIP codes or other geographic boundaries); (2) rates are based on loss experience in the target GRID cell and nearby GRID cells, as opposed to large areas covering multiple ZIP codes or counties with portions remote from the location of interest; (3) improved matching of price to risk over current territorial rating; (4) promotes smoother transitions from higher cost areas to lower cost areas; and (5) can utilize data external to insurer database information, such as historical meteorological data.

According to this disclosure, GRID cells are defined as non overlapping geographic areas defined by truncated latitude and longitude values, wherein the size of the GRID cells can vary depending on the level of truncation precision. A truncation example is provided that illustrates how the level of truncation can be used to capture more or fewer point locations in a given GRID cell. The example in TABLE 1 has nine point locations that exist at the noted latitude and longitude coordinates. Each point is lettered and is accurate to six positions to the right of the decimal for both latitude and longitude.

TABLE 1

| Point Name | Latitude | Longitude | Premium |
|---|---|---|---|
| A | 42.221623 | −80.241321 | 145 |
| B | 42.224237 | −80.248427 | 225 |
| C | 42.226772 | −80.242043 | 412 |
| D | 42.229623 | −80.242843 | 299 |
| E | 42.228791 | −80.247182 | 305 |
| F | 42.228423 | −80.238221 | 205 |
| G | 42.228911 | −80.251822 | 335 |
| H | 42.230879 | −80.249142 | 289 |
| I | 42.225291 | −80.236382 | 435 |

To develop a summarized amount of premium for a particular area (GRID cell), the absolute value of latitude and longitude for each point are truncated at two decimal positions and grouped in a query of the database. These summaries are listed in TABLE 2.

TABLE 2

| Point Name | Latitude | Longitude | Premium |
|---|---|---|---|
| A | 42.22 | 80.24 | 145 |
| B | 42.22 | 80.24 | 225 |
| C | 42.22 | 80.24 | 412 |
| D | 42.22 | 80.24 | 299 |
| E | 42.22 | 80.24 | 305 |
| F | 42.22 | 80.23 | 205 |
| I | 42.22 | 80.23 | 435 |
| G | 42.22 | 80.25 | 335 |
| H | 42.23 | 80.24 | 289 |

With this level of truncation, the nine points fall into four different GRID cells, which are bounded by two decimal point precision latitude and longitude lines. Next, the points are grouped according to the truncated latitude and longitude, as shown in TABLE 3.

TABLE 3

| Latitude | Longitude | Total Premium |
|---|---|---|
| 42.22 | 80.24 | 1386 |
| 42.22 | 80.23 | 640 |
| 42.22 | 80.25 | 335 |
| 42.23 | 80.24 | 289 |

The latitude and longitude coordinates are components of an unique identifier, GRID ID, which is used to identify each GRID cell. GRID ID is determined by first taking the absolute value of the latitude and longitude coordinates, truncating the coordinates to a specified number of digits, eliminating the decimal point, and finally concatenating the resulting values together. The specified digits include three digits to the left of the decimal place in order to accommodate up to 180 degrees of longitude. The GRID ID matches the latitude and longitude of the lower right corner (the Southeast corner) of the GRID cell. The following transformation may be implemented in software as a grid block determination means.

| Latitude | Longitude | | GRID ID |
|---|---|---|---|
| 42.22 | 80.24 | → | 0422208024 |

This example uses a single attribute to demonstrate the grouping, but incurred losses or other factors could also have been used. The truncation method can be used as part of an actuarial flow where total premium is compared to total losses and other factors to develop an appropriate rate for a grid area. The GRID ID may be represented as a single numeric value, e.g., 0422208024, or may be represented by its component parts, e.g., 04222 and 08024. While the examples provided show latitude and longitude represented in decimal format, other formats can provide the same function including, for example, degrees, minutes, and seconds.

At this point in the disclosure, reference to the figures may be helpful.

FIG. 1 illustrates a stylized town map overlaid with a coordinate grid, according to certain embodiments of the present disclosure. This map provides some context for the Map 100 includes a 7×9 array of coordinate gridblocks, locations A-F, river 101, highway 102, surface streets 103, and neighborhoods 110, 111, and 112. The coordinate grid includes gridlines at hundredths of a degree from 30.420N to 30.429N and from 97.270W to 97.277W. Note that a reference to a grid block at (X, Y) will refer to the block with a lower right corner at coordinate (X,Y). For example, highway 102 crosses river 101 in grid block (97.272W, 30.425N). Locations A-F are each associated with a latitude/longitude coordinate pair. Each location A-F may represent a real property location to be insured, a physical location where personal property may be garaged or kept, or the location of historical data point (e.g., claim or crime scene).

River 101 is a body of water separating neighborhood 111 from 110 and 112. River 101 may represent other geological or geographical barriers like steep inclines or ravines. River 101 may represent a rail line or limited access roadway. These barriers may represent disparate data sets where, for example, neighborhood 110 may represent a collection of homes. In contrast, neighborhood 112 may include a mix of commercial and residential properties. Finally, neighborhood 111 may be an urban city center with high-rise offices and residences. When rating a homeowner's policy for location A, data from locations C, D, and E within neighborhood 110 may be more relevant than data from a high-rise condominium building at location B. This may be the case even though location B is closer than locations C, D, and E. Moreover, even if location B is a single-family residence, the homes at locations A and B may be of significantly different character, and therefore less relevant to each other from an insurance rating perspective.

In some embodiments, river 101 may represent a political border (e.g., between states or countries). Because insurance is regulated by political entities, namely each of the fifty United States plus the District of Columbia, data may be compartmentalized with a state's borders. This compartmentalization may be for accounting purposes and may be required by law or regulation.

Highway 102 is a major vehicle artery cutting through the center of the town and spanning river 101. Highway 102 may present a similar barrier as river 101. Highway 102 may also provide access to emergency services such as fire or police departments. Surface streets 103 are roadways, paths, or other means for surface transportation.

Figure 2:
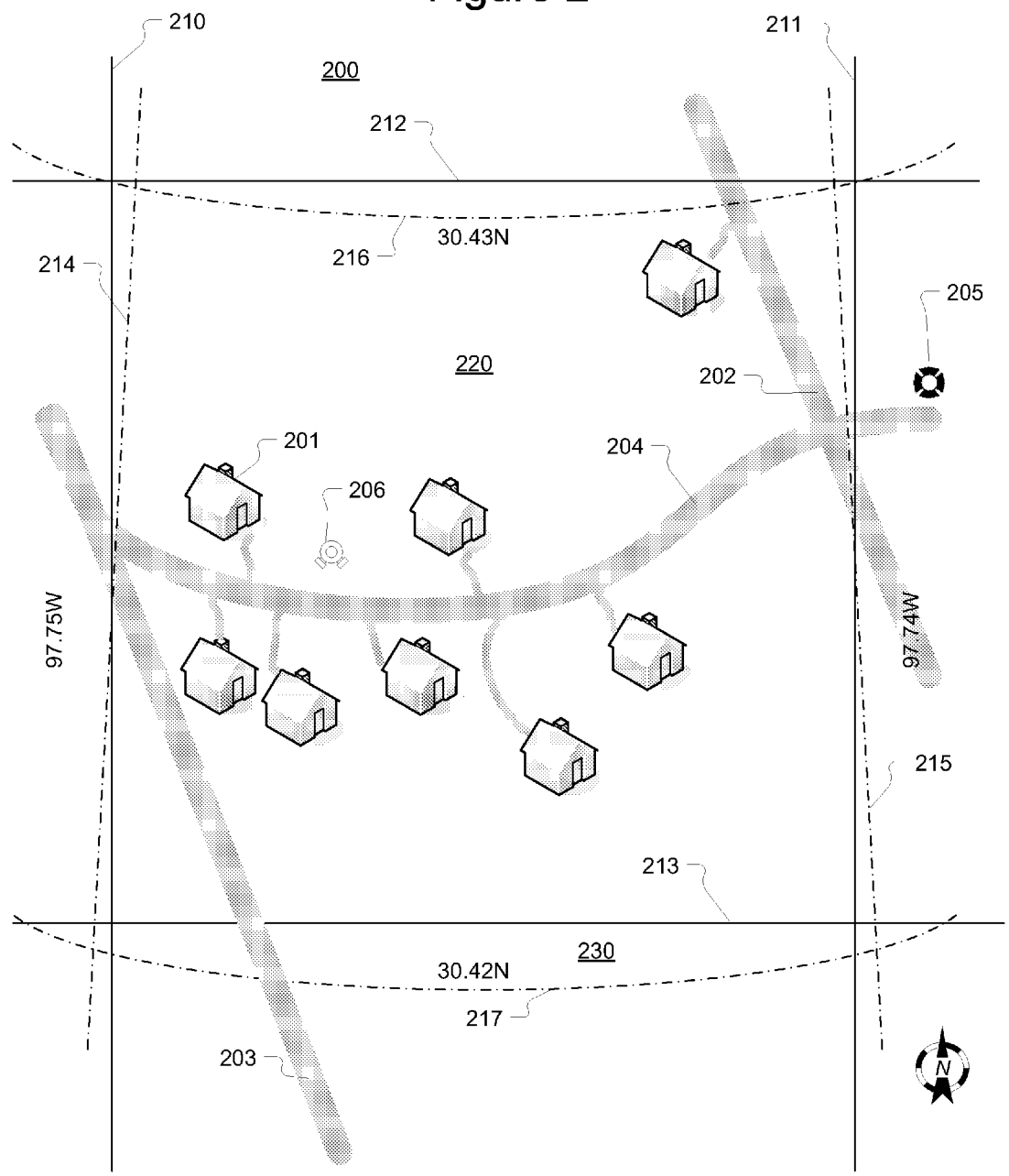
FIG. 2 illustrates a stylized neighborhood map with two different gridline representations, according to certain embodiments of the present disclosure.

FIG. 2 illustrates a stylized neighborhood map with two different gridline representations, according to certain embodiments of the present disclosure. Map 200 includes properties 201, roads 202, 203, and 204, fire station 205, fire hydrant 206, equidistant gridlines 210, 211, 212, and 213, and coordinate gridlines 214, 215, 216, and 217.

Properties 201 represent real estate structures subject to insurance rating, subject to insurance claims, and the locations for insurance-related events. Properties 201 are illustrated as detached, single-family residences, but may be any sort of real property. For example, some of these properties may be multi-family properties such as duplexes, triplexes, or condominiums. Some properties may be adjoining town homes or row houses. Some properties may be mid-rise or high-rise apartments or condominiums. Some properties may be zoned for residential, commercial, industrial, or municipal use. Some properties may be unimproved land in a natural state or subject to some other use. Properties 201 need not be homogenous as a single-family detached home may be located next to a condominium project and next to a retail establishment.

Roads 202, 203, and 204 connect properties 201 to allow transportation of people, items, and vehicles between or past those properties. Roads 202, 203, and 204 are illustrated as uniformly sized, paved, residential roads, but may be any sort of road. Some roads may be paved with asphalt, brick, concrete, or stone. Some roads may be made from gravel. Some roads may be dirt roads. Some roads may be pedestrian walkways or bike paths. Some roads may include dedicates lanes for motor vehicles and bicycles. Roads may have any number of lanes and may have painted stripes demarking lanes of traffic. The intersections of roads 202, 203, and 204 may include traffic control devices such as yield signs, stop signs, or traffic lights.

Fire station 205 and fire hydrant 206 represent insurance-related community services. Other services may include police stations and hospitals. Proximity to insurance-related community services may afford some protection against certain types of loss or may reduce the likely impact of certain events. For example, a nearby community police station may reduce the likelihood of certain property crimes. In another example, a nearby fire station may reduce the response time for emergency medical or fire assistance, thereby reducing the likelihood of medical complications or total loss of a property to fire.

Equidistant gridlines 210, 211, 212, and 213 illustrate one data segmentation approach, wherein a map is overlaid with a set of virtual gridlines spaced an equal distance from each other in a given direction. In this case, gridline 210 is 1000 m West of gridline 211 and gridline 212 is 1000 m North of gridline 213. This one kilometer grid (or a one mile grid) provides a well understood and easy to illustrate segmentation of zones on a map. In particular, equidistant gridlines 210, 211, 212, and 213 define GRID cell 220, which is roughly one square kilometer. One drawback of the equidistant grid is that any data point associated with a coordinate pair—defined as (latitude, longitude)—must be mapped into this equidistant grid system prior to analysis with other data points within the grid block. For example, if property 201 at location (30.426N, 97.749W) is the subject of a rate quote, the rating system must first determine that location coordinate pair falls within GRID cell 220. Then the rating process may proceed.

Coordinate gridlines 214, 215, 216, and 217 illustrate another data segmentation approach, wherein a map is overlaid with a set of gridlines following longitudinal and latitudinal lines. (The term coordinate grid is used here to refer to latitude/longitude grid used by, for example, the United States Geological Survey.) The coordinate gridlines 214 and 215 follow the 97.75W and 97.74W longitudes, respectively. The coordinate gridlines 216 and 217 follow the 30.43N and 30.42N latitudes, respectively. These coordinate gridlines are spaced at two decimal places of the latitude/longitude coordinates, but other spacing may be appropriate as will be discussed below. In some embodiments, a variable spacing may be used wherein some data is accessed or processed according to a narrower spacing than other data. In certain embodiments, two or more sets of coordinate gridlines may be used for certain types of data or certain locations, e.g., where data density may vary significantly. In one example, property damage experience data may be dense in an urban location while climate data may be relatively sparse, suggesting that property damage experience data may be queried using a smaller coordinate block size than climate data. In another example, property damage experience data may be sparse in a rural farming community suggesting that damage experience data may be queried using a larger coordinate block size than in a dense urban situation.

The curvature of the illustrated coordinate gridlines is exaggerated to illustrate one major difference between this gridline system and the equidistant gridline system. Rather than form a square, the coordinate gridlines 214, 215, 216, and 217 form an oblong GRID cell 230, roughly 1100 meters tall following a longitudinal cross-section and roughly 960 meters across following a latitudinal cross-section. These distances are calculated based on the well-documented Haversine formula—though other formulas may be employed. This oblong shape will be more pronounced at higher latitudes, e.g., at 64.72N in Fairbanks, Ak. where the same two-decimal grid block would be roughly 1110 meters by 480 meters. In some embodiments, the coordinate gridlines used at such an extreme northern latitude may be adjusted to more closely approximate a square grid block. This may be accomplished, for example, by defining a grid block with corners at (64.72N, 147.48W) and (64.73N, 147.50W), or incrementing the latitude by 0.01 degrees while incrementing the longitude by 0.02 degrees.

Data Aggregation in the Ratemaking Process

GRID Based Rating utilizes latitude and longitude coordinates to establish a network of small territories or "GRID cells" across a state or region. Each GRID cell represents a defined area, with corner points defined in terms of truncated latitude and longitude. Each policy is assigned to a GRID cell based on its latitude and longitude coordinates, which are determined by using a reference's location address or the address where a vehicle is garaged.

The premium and loss experience used to calculate policy pricing may be derived from data associated with a target cell—or the GRID cell that encompasses the target location as well as data associated with surrounding GRID cells. The aggregate risk exposure is determined based on the data associated with the target cell and the immediately surrounding GRID cells. Certain embodiments incorporate an iterative search process using progressively larger data sets with each data set incorporating data associated with GRID cells that are progressively further from the target cell. This method may ensure that the most geographically relevant data is included in the calculations for each target location. GRID Based Rating uses this data to derive Location Rating Factors (LRFs) for each GRID cell.

Figure 3A:
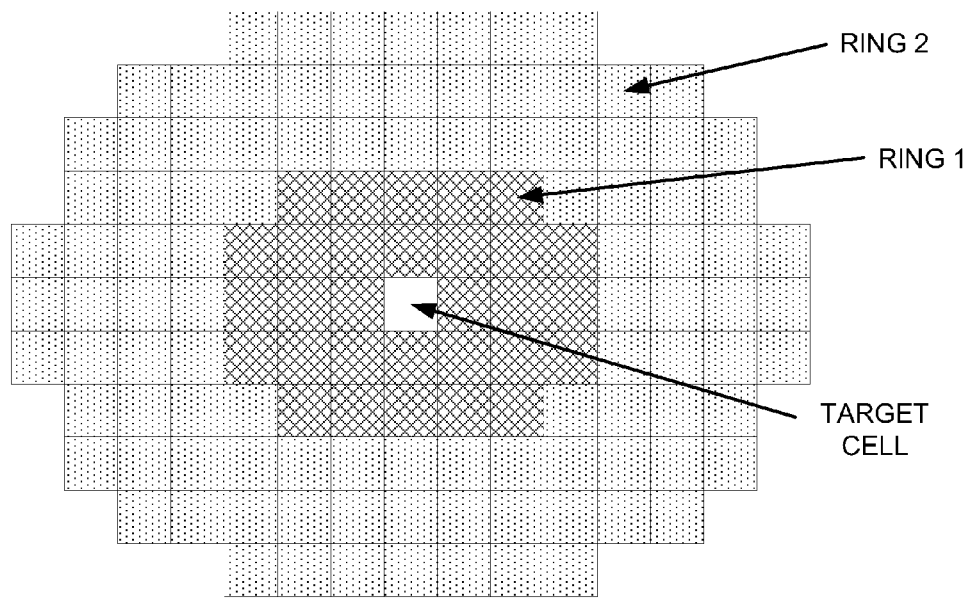
FIGS. 3A-B illustrate two variations of a process of gathering progressively larger amounts of geographically relevant data from GRID cells.
Figure 3B:
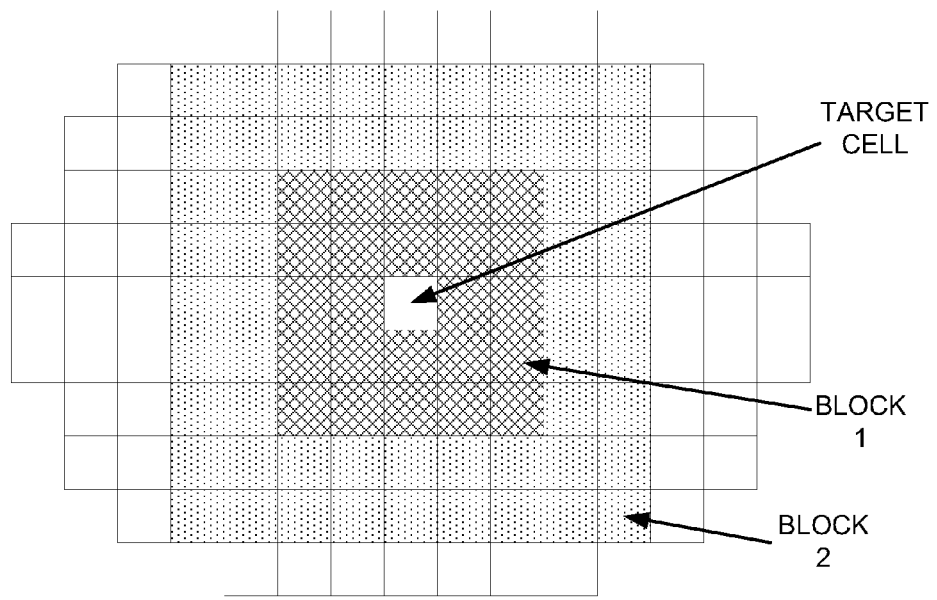

FIGS. 3*a*-*b* illustrate two variations of a process of gathering progressively larger amounts of geographically relevant data from GRID cells. Both figures are oriented with the top of the page representing geographic North and the right side of the page representing geographic East.

FIG. 3*a* illustrates a process of gathering progressively larger amounts of geographically relevant data using concentric rings around a target GRID cell. FIG. 3*a* includes a target cell, ring 1 surrounding and contiguous with the target cell, and ring 2 surrounding and contiguous with ring 1. The number of rings and the size of each ring may vary to accommodate different data requirements, geographic anomalies, etc. In some embodiments, each ring includes an equal number of grid cells along both the North/South cross-section as with the East/West cross-section. In other embodiments, more or fewer grid cells may be included across a North/South cross-section than are included across an East/West cross-section in order to more closely represent equal geographic distance in each direction. Two rings are illustrated, but more or fewer rings may be utilized. In some embodiments, the target cell may be referred to as ring 0.

According to one aspect of the invention, there is a method having the following steps: collecting data for the target cell and determining whether the current data collection has enough historical data to provide actuarially credible results. If not, an iterative process is performed including collecting data from rings of GRID cells immediately surrounding the cell(s) for which data has been collected and evaluating at each iteration whether enough historical data has been collected. Once a credible set of data has been collected, distance weighting and credibility weighting are applied and a pure premium is calculated.

FIG. 3*b* illustrates an alternative process of gathering progressively larger amounts of geographically relevant data using concentric blocks around a target cell. FIG. 3*b* includes a target cell, block 1 surrounding and centered on the target cell, and block 2 surrounding and centered on the target cell. While blocks 1 and 2 are illustrated as squares, each may be a rectangle to compensate for rectangular GRID blocks at high or low latitudes.

In certain embodiments, the iterative process first gathers data from the target cell and determines if additional data is needed to get a credible data set. If so, data is gathered from block 1 (including duplicate data from the target cell) and a distance weighting is applied. In certain embodiments, duplicate data may be explicitly excluded. In other embodiments, the duplicate data is left in the set for computational efficiency and any skew is lessened through the application of the distance weight. This process iterates until a sufficient amount of data has been collected to satisfy a credibility threshold.

In certain computational environments, the process illustrated in FIG. 3*b* may be preferable as it may be simpler and/or faster than the process illustrated in FIG. 3*a* because data may be queried with two boundary points (representing a rectangle) rather than a series of boundary points representing the more circular rings illustrated in FIG. 3*a*.

Figure 4:
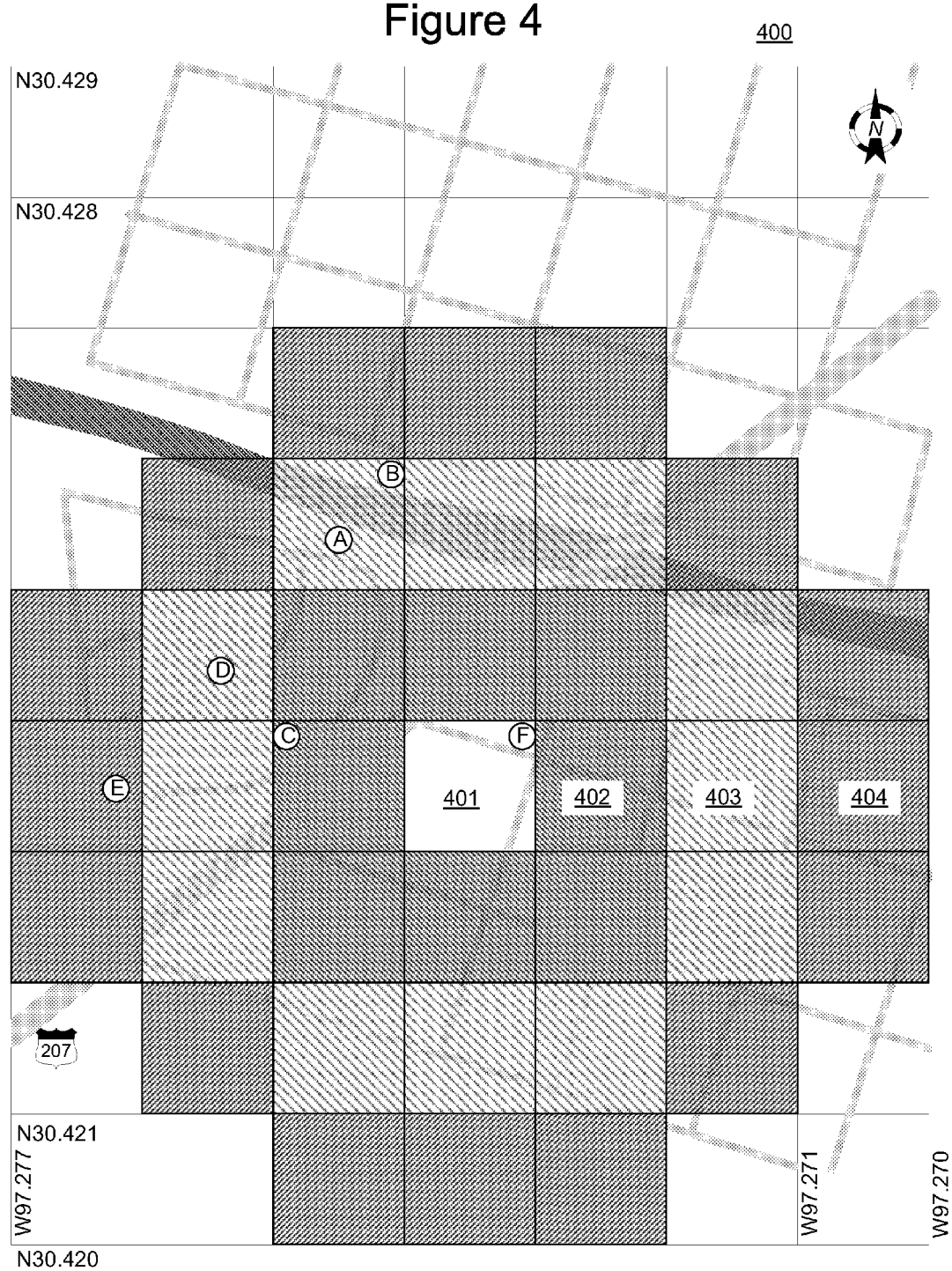
FIG. 4 illustrates a stylized town map superimposed with rings according to certain embodiments of the present disclosure.

FIG. 4 illustrates a stylized town map superimposed with rings according to certain embodiments of the present disclosure. Map 400 illustrates the same points of interest as FIG. 1 as well as target cell 401 and rings 402, 403, and 404. In this illustration, locations F and B each represent high-rise residential buildings while locations A, C, D, and E represent single family homes. If the standard ring-based method is utilized on this data set, data associated with location C may carry more weight in the calculation than data associated with location B because location C is in the first ring (ring 402) and location B is in the second ring (ring 403). The distance weighting will reduce the weight accorded to data associated with location B. Because location B is more similar to location F than C, certain techniques may be applied to filter the data based on relevancy criteria. In some embodiments, data may be associated with attributes. For example, a claim for windstorm related roof damage a location C may be associated with an attribute of "single-family residence." In another example, a claim for smoke damage due to an electrical fire at location B may be associated with an attribute of "high-rise residence." In some embodiments, the query for data in a given cell or ring may include a Boolean filter to restrict results, e.g, "NOT 'single-family residence'" or "AND 'high-rise residence.'" In some embodiments, a post processing step may apply a lesser weight to results not associated with "high-rise residence."

Data Relevant to the Ratemaking Process

With an understanding of the generalized data gathering process, some elaboration is necessary as to the types of data relevant to ratemaking. In certain embodiments, a first step of the method is to collect historical data on a given target GRID cell and all nearby GRID cells within a specified radius. In this step, an exposure adjustment may also be applied by peril (e.g., fire, crime, and other extended coverage). Data may be collected from a variety of sources both internal and external to the insurance provider. For example, data may be collected regarding fire station and fire hydrant locations and characteristics, weather data, government data, in particular census, tax, population, traffic, employment, businesses, crime statistics, soil, vegetation, flood planes, burn zones, etc. Telematic devices may also be attached to cars to collect use and driving data.

Census data may include: population density, average number of vehicles per household, average travel time, and travel type (drive, car pool, public transportation, etc.). Census data may be obtained from third party vendors or other external sources. Fire station data may include: distance to responding fire station, distance to nearest fire station, fire station type (paid, volunteer, combination, other), and fire station characteristics (trucks, equipment, water supply, etc.). Fire Station data may be obtained from third party vendors or other external sources. Crime data may include: robbery counts, burglary counts, larceny-theft counts, motor vehicle theft counts, and arson counts. Brush fire data may include: brush fire potential, and vegetation index. Weather data may include: average number of hail events, average hail stone size per event, average number of tornado events, average tornado rating per event, average tornado length per event, average tornado width per event, average annual rainfall, average annual snowfall, average high temperature, average low temperature, and frequency of weather watches and warnings issued. Other data may include: traffic density, average driving distance, earth aspect (measures the amount of sunlight at a location), slope, fault lines, and soil type.

Historical data may be collected from data sources that are both internal and external to an insurance company. In some cases, data external to an insurance company may not be used because the data is randomly available within/across states and data may have limited additional explanatory value.

Unless otherwise specified, average and statewide values may be treated as constants for the purposes of the present invention if those values remain constant for some period of time. In other words, if two policies that cover properties at two locations at opposite corners of a large state are rated at roughly the same time, any average or statewide value that remains the same in both rating calculations will be referred to herein as a constant.

When data is collected from outside an insurance provider, the data may need to be mapped into the coordinate grid in order to speed lookup and simplify the required database queries. For example, the outside data may be initially associated with postal ZIP codes, street addresses, school districts, or any other geographic locations and regions.

Figure 5:
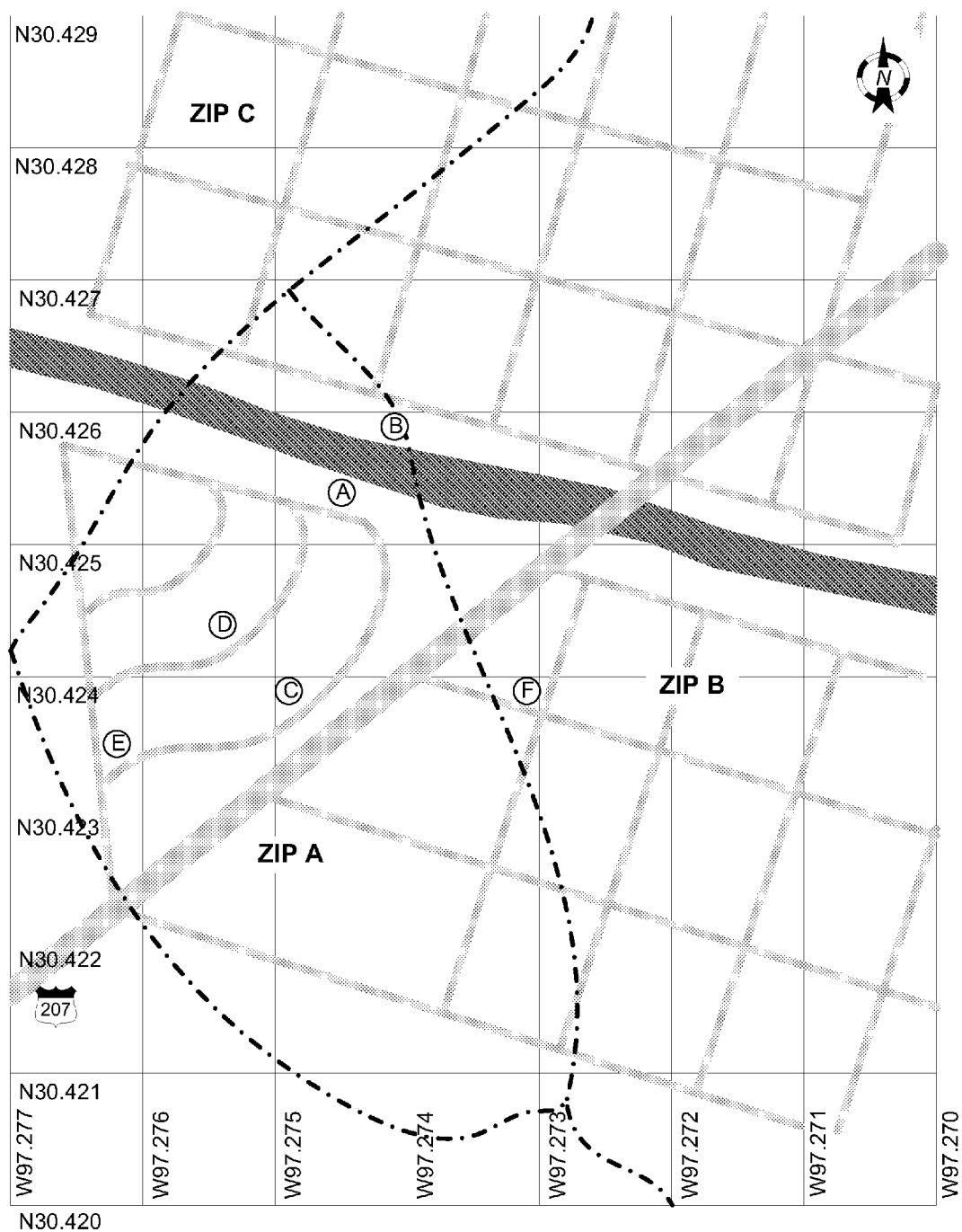
FIG. 5 illustrates the stylized town map overlaid with a coordinate grid and an alternative set of geographic boundaries, namely ZIP codes.

FIG. 5 illustrates the stylized town map overlaid with a coordinate grid and an alternative set of geographic boundaries, namely ZIP codes. Map 500 illustrates at least three ZIP codes, ZIP A is contained within map 500, while ZIP B and ZIP C each appear to extend beyond the edges of map 500. Map 500 illustrates how postal ZIP codes may not coincide with the coordinate lat/long grid. In one example, postal ZIP A is shown to completely encompass a number of grid cells, e.g., the grid cells encompassing each of locations C and D. ZIP A also includes portions of a number of other grid cells, e.g., a portion of the grid cell encompassing location E.

If data is associated with a ZIP code, rather than a grid cell, a grid-based query will not retrieve that data. For example, assume that ZIP A is associated with negligible levels of flammable vegetation, thus reducing the risk of a loss due to fire relative to homes in areas of higher levels of flammable vegetation. ZIP A may cover an urban area, while ZIP B may abut a forest. The data associated with ZIP A will be called the ZIP A Data. In order to perform a grid-based query, it is desirable to associate the ZIP A Data with one or more grid cells covered by ZIP A.

Figure 6:
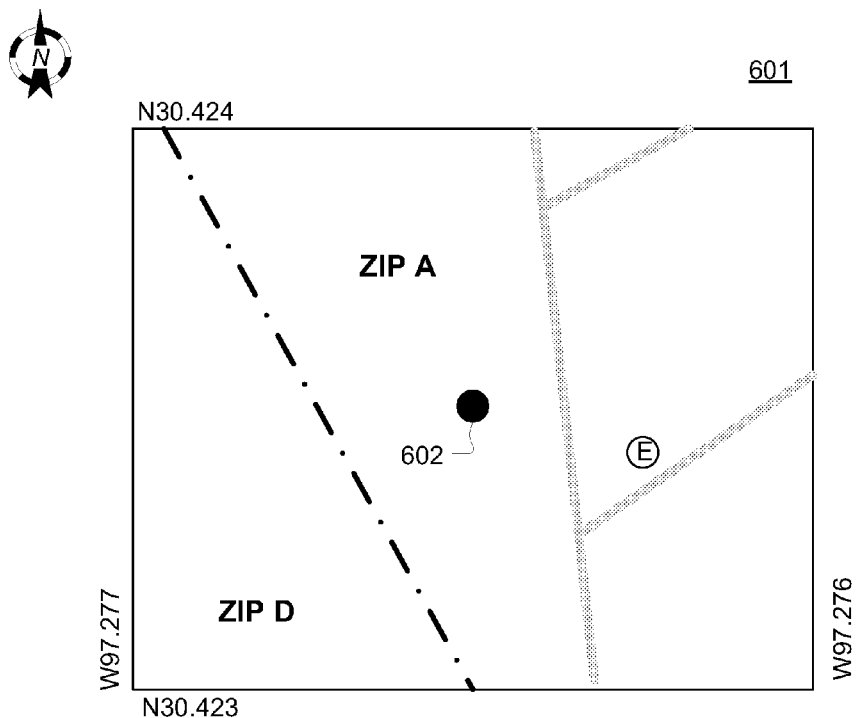
FIG. 6 illustrates various approaches to mapping data into a grid-based representation scheme.
Figure 6:
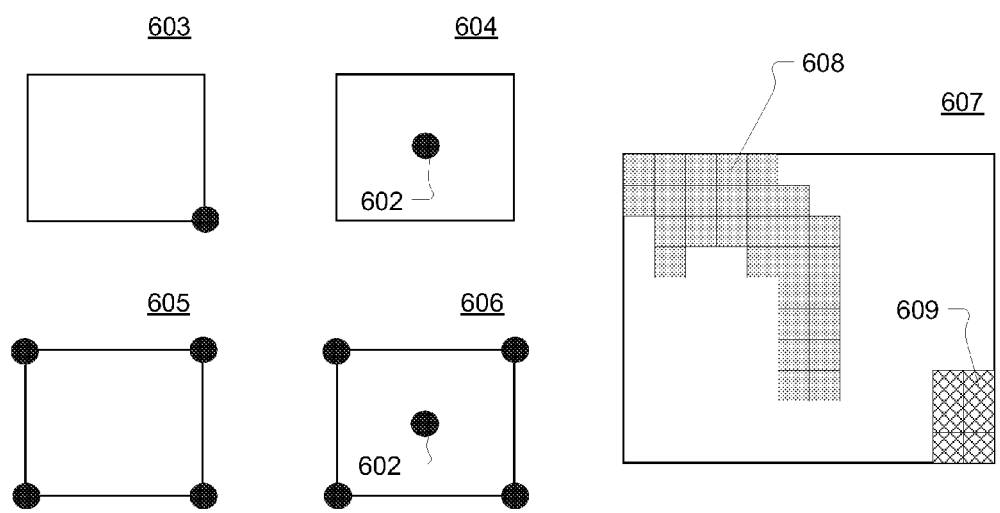

FIG. 6 illustrates various approaches to mapping data into a grid-based representation scheme. Specifically, FIG. 6 includes a zoomed in representation of a specific grid cell including location E and includes five separate abstract grid cells illustrating five means for mapping data into a grid cell. Grid cell 601 includes grid boundaries at N30.424, N30.423, W97.277, and W97.276, and center point 602 located at N30.4235, W97.2765. A boundary line between ZIP A and ZIP D intersects the grid cell illustrated in map 601. The GRID ID for this cell is 030423097276 assuming a GRID resolution of three decimal points. Grid cells 603-606 illustrate four example methods of mapping data into the grid cell, origin mapping 603, center point averaging 604, four corner averaging 605, five point averaging 606, and pixel counting 607.

Using origin mapping 603, a data value associated with ZIP A will be associated with cell 030423097276 because the origin of this cell (marked by a single dot) is within ZIP A. Using center point averaging 604 results in the same mapping because center point 602 is also in ZIP A.

Using four corner averaging 605, a numeric data value is retrieved for each corner of the grid cell with the average of the four points saved as the representative attribute of cell 030423097276. For example, if ZIP A is associated with an average vegetation coverage of 0.25 and ZIP B is associated with an average vegetation coverage of 0.60, then the average is 0.43 rounded to two decimal places. That average number would then be stored in the database in association with cell 030423097276.

Using five point averaging 606, a value is retrieved for the center point and each of the corners. The average of the five values is then associated with 030423097276. Here, the average of vegetation coverage values of 0.25, 0.25, 0.25, 0.60, and 0.60 is 0.39.

Using pixel counting 607, a portion of a raster map (e.g., from a graphic image file) is superimposed on a grid cell and aligned. The raster map may be a graphical representation of a topographical map or other graphically represented information. In this approach, each non-zero pixel within the grid cell boundaries is counted and the average coverage of the grid cell is applied to the value represented by the raster map. For example, in pixel counting 607, a total of 35 out of 120 pixels are shaded in the raster map. A total of 29 pixels 608 (shaded grey), covering approximately 24% of the 120 pixels in the grid cell, may be associated with a mask value of 0.045. A total of 6 pixels 609 (with crosshatching), covering 5% of the grid cell, may be associated with a mask value of 0.820. As a result, the average mask value is (0.045*0.24)+(0.820*0.05), or 0.052. In some embodiments, a minimum or maximum mask value may be associated with the grid cell.

Figure 7A:
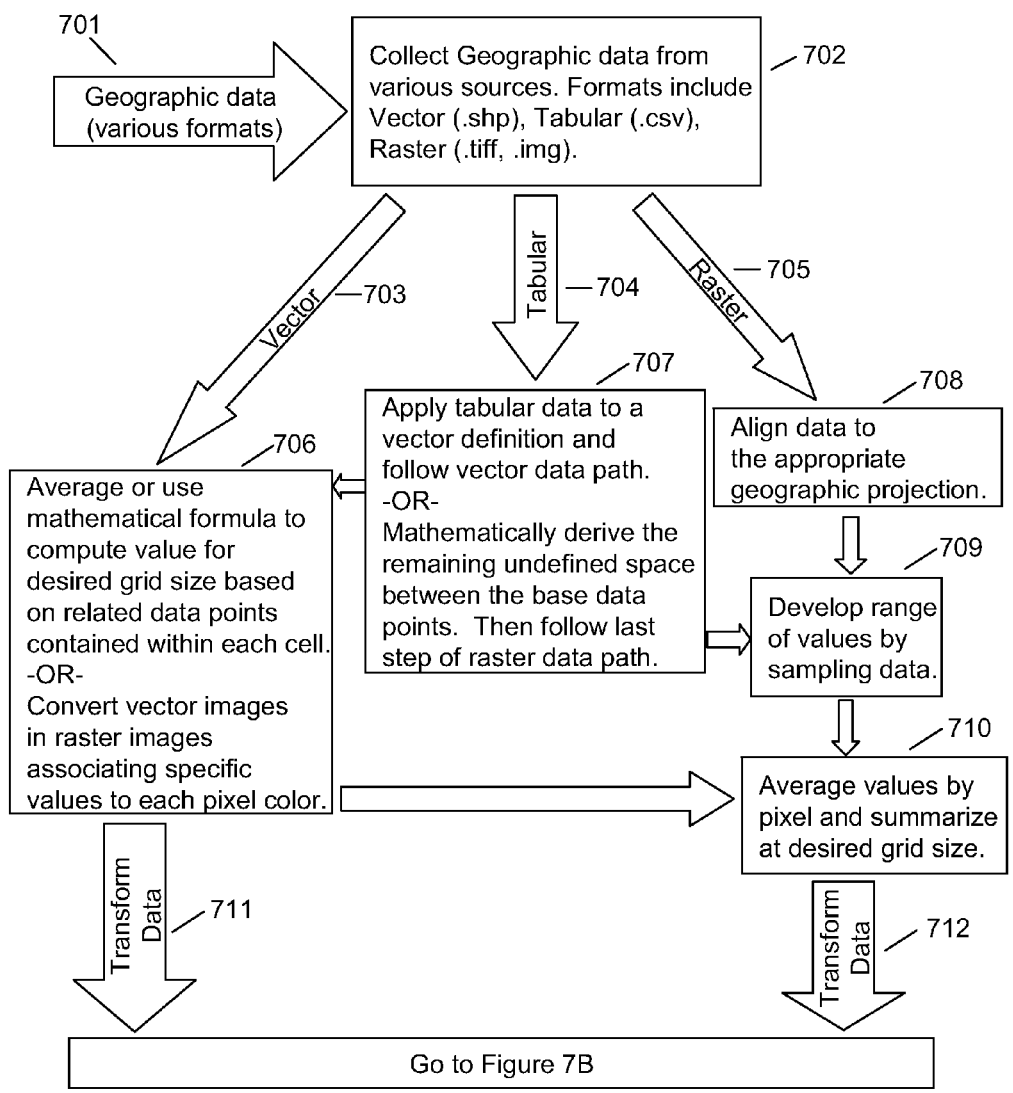
FIGS. 7A-7B illustrate processes for coordinating data with a GRID map according to an embodiment of the invention is disclosed according to a flow chart.
Figure 7B:
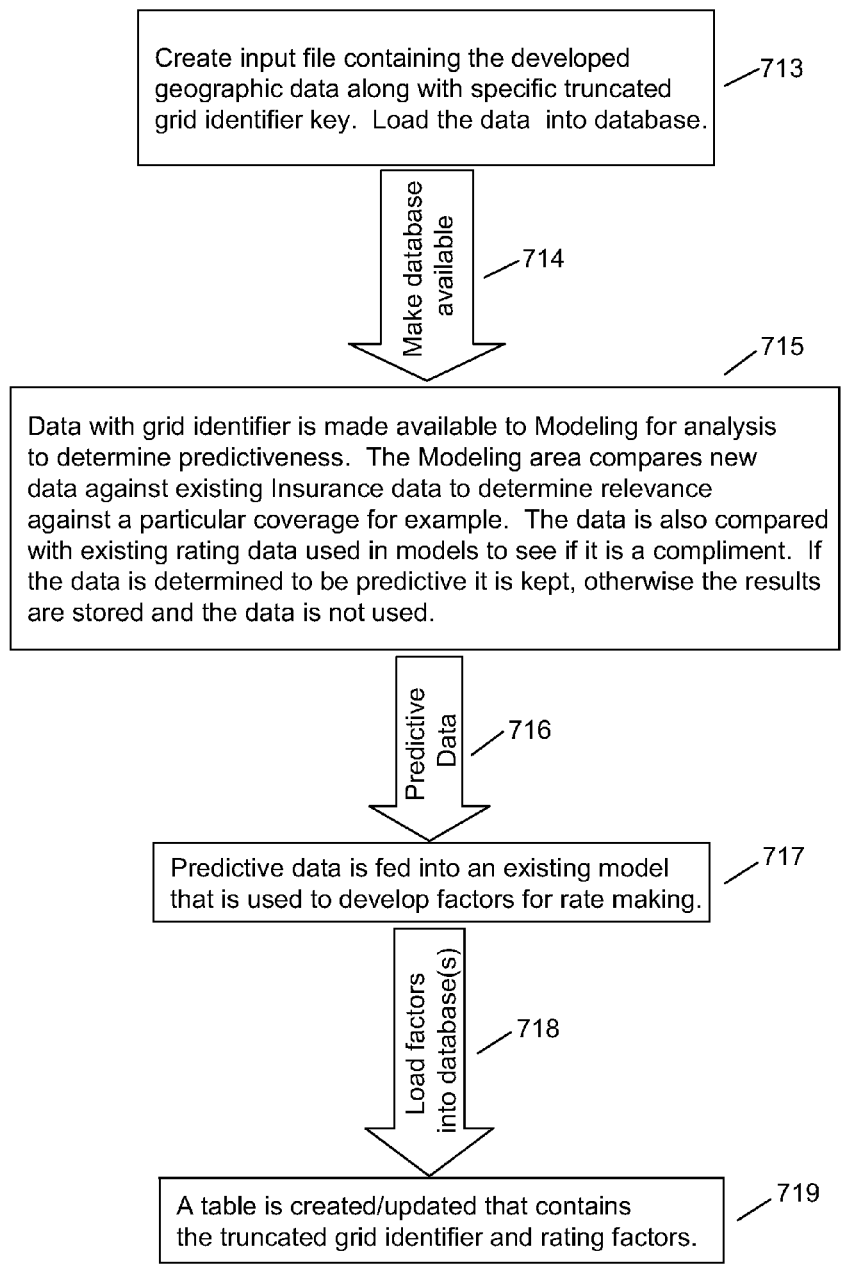

Referring to FIGS. 7a-7b, processes for coordinating data with a GRID map according to an embodiment of the invention is disclosed according to a flow chart. Geographic data in various formats are identified in 701. The geographic data is being collected 702 from various sources. The formats may include Vector (.shp), Tabular (.csv), Raster (.tiff, .img). For the Vector data 703, a mathematical formula (e.g., using methods 603-606) may be applied 706 to compute a value for a grid based on related data points contained within each GRID cell. Alternatively, the Vector images 703 may be converted 706 into Raster images associating specific values to each pixel color (e.g., using method 607). The collected tabular data 704 may be applied 707 to a Vector definition and then one can follow a Vector data path. Alternatively, the tabular data 704 may be mathematically derived so that the remaining undefined space between the base data points is obtained. The result of the process of step 707 may then be applied to step 706 as described above or to step 709 as described below. The Raster data 705 may be aligned 708 to the appropriate geographic projection. Next, both the aligned Raster data 705 and the applied tabular data 704 may be used to develop a range of values by sampling data 709. The sample data may then be used to obtain average values by pixel and summarized at desired grid size at step 710. At this stage, all of the Vector 703, tabular 704, and Raster 705 data may then be transformed as steps 711 and 712. An input file is then created 713 containing the developed geographic data along with specific truncated grid identifier key. The data is then loaded into the database. The database is then made available 714. The data with grid identifier is then made available 715 to modeling for analysis to determine predictiveness. The modeling area compares new data against existing insurance policy data to determine relevance against a particular coverage for example. The data is also compared with existing rating data used in models to see if it is a compliment. If the data is determined to be predictive, it is kept, otherwise the results are stored and the data is not used. The result is the predictive data 716. The predictive data has been fed 717 into an existing model that is used to develop factors for rate making The factors 718 are loaded into databases. A table is then created/updated 719 that contains the truncated grid identifier and rating factors.

Figure 7C:
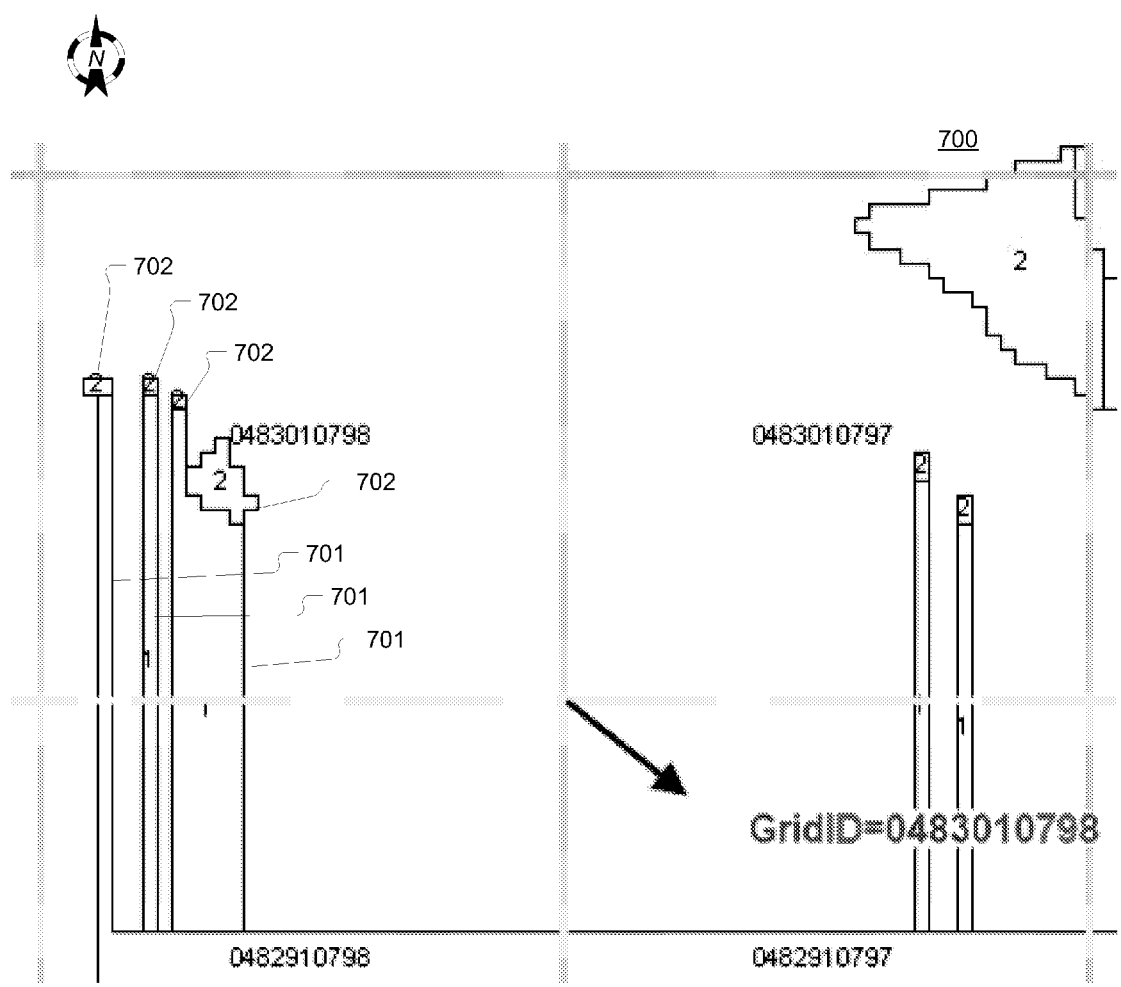
FIG. 7C illustrates an example of graphical information to be mapped into a GRID-based data structure.

FIG. 7c illustrates an example of graphical information to be mapped into a GRID-based data structure. While the following description refers specifically to a brush fire risk, the techniques can be applied to any data element in order to assign specific data values to GRID cells. The insurer has been provided with data for states that have exposure to Brush Fire risk. The Brush Fire Risk at a particular location considers several factors, including elevation, vegetation, land cover, etc., in addition to assigned risk values to areas in the state. The insurer has been provided maps of several states that show polygons and associated Brush Fire risk values. Risk values are 1, 2, 3, and 4. As the data provided is not by GRID, but rather by polygons of different sizes and shapes in a graphical information format, this document explains several methods to assign polygon risk values to GRID cells. A common geographical information system (GIS) file format is addressed herein as a non-limiting examples: Geospatial boundary files in GSB format and MapInfo® files.

Data provided from certain sources are converted to GSB files. User Defined Functions in insurer data stores utilize the GSB files to perform spatial look ups on latitude and longitude values and subsequently return the risk values associated with the polygon that contains the specified latitude and longitude coordinates. A single GRID cell covers a range of potential latitude and longitude coordinates. Thus, any GRID cell could contain coordinates that fall into one or more polygons, and thus the algorithm could return one or more risk values. As a result, several approaches have been examined to determine the best method to derive a single risk value for any given GRID cell.

Alternatively, data may be provided in, or converted to, a MapInfo® file, to determine the area covered by each GRID and the associated Risk Values. When multiple polygons span a GRID cell, the GRID cell is assigned the risk value associated with the polygon that is represented by the largest area in the GRID cell. For example, the following map shows a GRID cell that is spanned by multiple polygons.

In map 700, the grid cell with GRID ID '0483010798' is spanned by seven polygons, three with a risk value of 1 (701) and four with a risk value of 2 (702). The area covered by each polygon spanning GRID '0483010798' is given in Table 4.

TABLE 4

| Polygon | Risk Value | Polygon Area |
|---------|------------|--------------|
| 1 | 2 | 0.000490051 |
| 2 | 2 | 0.000245184 |
| 3 | 2 | 0.000245026 |
| 4 | 2 | 0.003919830 |
| 5 | 1 | 0.005148140 |
| 6 | 1 | 0.005148140 |
| 7 | 1 | 0.284706000 |

Thus, upon summing the polygon areas, a risk value of 1 is assigned to GRID '0483010798'. An alternative related method could use the risk values and the polygon areas to develop a weighted average risk value for the GRID cell.

Gather Sufficient Data to Generate Actuarially Credible Results

With rating data stored in association with each GRID cell, the rating process can begin with a data collection means. The process starts at the target GRID cell, as that data is typically the most relevant to the rating process. In many cases, a target GRID cell by itself will not have adequate experience to produce an actuarially credible result so nearby data will be gathered as needed. According to one embodiment, the rating system collects loss/exposure data in ring increments until the query scope first reaches a maximum distance (e.g., a selected radius from the target GRID) or includes sufficient data to attain maximum credibility. In an iterative approach, the system makes a determination for each GRID cell ring increment as to whether the data gathered is adequate to produce a credible result. The ring is incremented as needed up to the threshold ring distance.

Because most rating calculations will include data from GRID cells surrounding the target GRID cell, calculations will tend to overlap. In other words, experience data in a given GRID cell will be used in the calculations for many nearby GRID cells. This data sharing helps to ensure a smoother transition of LRFs across adjacent GRID cells. In certain embodiments, an exception to this process is that GRID cells near certain boundaries (e.g., political or geographical) prevents the system from crossing those boundaries to gather data.

This iterative approach is illustrated in FIGS. 3 and 4. FIG. 3 illustrates a target GRID cell, a first ring of cells, and a second ring of cells. FIG. 4 shows the stylized town map and overlaid coordinate grid 400 as shown in FIG. 1. Additionally, FIG. 4 shows an overlaid series of GRID cell rings, according to certain embodiments of the present invention. Target GRID cell 401 is located near the center of the map. A first ring of GRID cells 402 is located around the target GRID cell 401. A second ring of GRID cells 403 is located around the first ring of GRID cells 402. A third ring of GRID cells 404 is located around the second ring of GRID cells 403. For this particular GRID ring configuration, location F resides within the target GRID cell 401. Thus, FIGS. 3 and 4 illustrate how the use of GRID cell ring increments may be used to gather an actuarially credible amount of data needed to rate a policy in the target GRID cell.

Credibility

This process of aggregating sufficient data to make a reliable and accurate risk assessment has been discussed above. In certain embodiments, this process is aided by the use of a well-known credibility formula, which is:

$$C = ZR + (1-Z)H$$

where:
R is the mean of the current observations (for example, the data)
H is the prior mean (for example, the estimate based on the actuary's prior data and/or opinion
C is the [insurance rate]
Z is the credibility factor, satisfying $0 \leq Z \leq 1$.

T. Herzog, Credibility: *The Bayesian Model Versus Bühlmann's Model,* 41 Transactions of Society of Actuaries 43-88, at 43 (1989) (herein incorporated by reference). The credibility factor Z is defined by:

$$Z = \frac{n}{(n+k)} \quad (4.1)$$

and satisfies $0 \leq Z \leq 1$; also, n is the number of trials or exposure units, and $$k = \frac{\text{expected value of the process variance}}{\text{variance of the hypothetical means}} \quad (4.2)$$

...

Herzog, at 53. The basic principle is that the credibility of the rate increases with quantity n or $N_z$ of relevant expected claims or exposure units. The credibility factor may also be calculated as a function of the expected number of claims ($N_z$) and the full credibility standard ($N_f$).

$$z = \sqrt{\frac{N_z}{N_f}}$$

G. Ventner, "Classical Partial Credibility with Application to Trend," *Proceedings of the Casualty Actuarial Society Casualty Actuarial Society* at 31 (1986) (herein incorporated by reference).

Adjust Historical Data for Distance

Because geographically distant data may be less relevant to the rating process than geographically near data, certain embodiments of the present disclosure may include a step of applying a distance weighting algorithm to discount or devalue data as a function of distant from the target cell. Thus, the method of these embodiments relies more heavily on the immediately adjacent GRID cell experience than on distant GRID cell experience. However, this weighting process may be more relevant to certain perils or coverages than others.

In the case of automobile insurance, calculations may be carried out on each major coverage to develop an initial indicated LRF by coverage. These amounts are then credibility weighted to develop the final indicated LRFs by coverage.

In the case of homeowners insurance, calculations may be carried out on each peril to develop an expected loss per policy, i.e.—pure premium, by peril. Where insurance companies do not develop Homeowners premiums by peril, an adjustment may be made to the exposure data by peril to account for any distributional differences in rating variables across a state or geographic area. The resulting exposure adjusted loss per policy amounts are then credibility weighted with an appropriate complement of credibility. These peril expected loss per policy amounts are then aggregated to an all peril basis and used to derive the all peril LRFs.

For homeowner policies, special considerations may be warranted. For example, due to the potential volatility in Homeowners data (or any insurance product line with low exposures), losses may be capped in various ways to mitigate the impact of shock losses or events. In some embodiments, losses may be capped based on the dollar amount incurred or paid over a specified period of time. For example, losses incurred or paid over a day, week, year or any other relevant period of time can be used in the analysis.

In other embodiments, individual claims may be capped at a specified threshold or otherwise removed to limit their impact on the final indicated LRFs.

In other embodiments, it may further be appropriate to cap actual losses per policy, i.e., pure premium, at a specified multiple of the complement of credibility. Table 5 provides an example.

TABLE 5

| Data Item | Value |
|---|---|
| Loss | $167,090 |
| Common Risk Exposure | 10.83 |
| Loss Pure Premium | $15,434.11 |
| Statewide Loss Pure Premium | $ 81.63 |
| Capped Loss Pure Premium | $ 326.52 |
| Credibility Standard | 1,250.00 |
| Claims | 4.00 |
| Credibility Factor | 0.0566 |
| Model Loss Pure Premium | 90.20 |
| Relativity | 11.738 |
| Relativity with Capped Pure Premium | 1.269 |

Losses in the above table and throughout this document may or may not include loss expenses and may or may not include losses due to catastrophic events. Losses and loss expenses may also be on a paid, case incurred, or total incurred basis.

Apply Credibility Weighting

A further step of the process may be to apply credibility weighting using an appropriate credibility complement. Peril credibility standards may be developed based on accepted methodologies. Credibility standards may be based on confidence intervals and acceptable error thresholds.

Calculate Pure Premiums

Yet another step of the process may be to calculate pure premiums for each target GRID cell. For example, expected pure premium may be calculated by peril or coverage and then aggregated to an all-peril or all-coverage basis.

According to an embodiment of the invention, pure premiums may be calculated using a provision that represents a long term average loss per exposure or alternatively be set to another appropriate provision, such as setting them equal to statewide pure premiums. Then, the peril or coverage pure premiums may be aggregated to an all-peril or all-coverage basis.

According to an embodiment of the invention, exposure may be adjusted to account for any distributional differences in rating variables across a state or geographic area. Peril or coverage specific adjustment factors may be used. An average GRID cell adjustment may be calculated relative to an average statewide adjustment. For example, Table 6 illustrates an example process to develop exposure adjustments for two GRIDs.

TABLE 6

| GRID | Exposure Count | Deductible (1) Value | Adjustment | Construction (2) Value | Adjustment | (1) * (2) |
|---|---|---|---|---|---|---|
| 0369010450 | 10 | $500 | 1.25 | Frame | 1.00 | 1.2500 |
| 0369010450 | 20 | $500 | 1.25 | Masonry | 0.85 | 1.0625 |
| 0369010450 | 20 | 1% | 1.00 | Frame | 1.00 | 1.0000 |
| | | | | GRID Weighted Average | | 1.0750 |
| 0369010451 | 20 | $500 | 1.25 | Frame | 1.00 | 1.2500 |
| 0369010451 | 10 | $500 | 1.25 | Masonry | 0.85 | 1.0625 |
| 0369010451 | 40 | $1,000 | 1.05 | Masonry | 0.85 | 0.8925 |
| 0369010451 | 25 | 1% | 1.00 | Frame | 1.00 | 1.0000 |
| 0369010451 | 15 | 2% | 0.90 | Masonry | 0.85 | 0.7650 |
| | | | | GRID Weighted Average | | 0.9800 |
| | | | | State Weighted Average | | 1.0097 |

The above example assumes only two GRIDs exist in the state. Table 7 provides the weighted adjustment and the exposure adjustments for the two illustrative GRIDs of Table 6.

TABLE 7

| GRID | Weighted Adjustment | Peril Exposure Adjustment |
|---|---|---|
| 0369010450 | 1.0750 | 1.0647 |
| 0369010451 | 0.9800 | 0.9706 |
| Statewide | 1.0097 | 1.0000 |

Develop Location Rating Factor

A further step of the process may be to develop an indicated Location Rating Factor.

Process Steps

Figure 8:
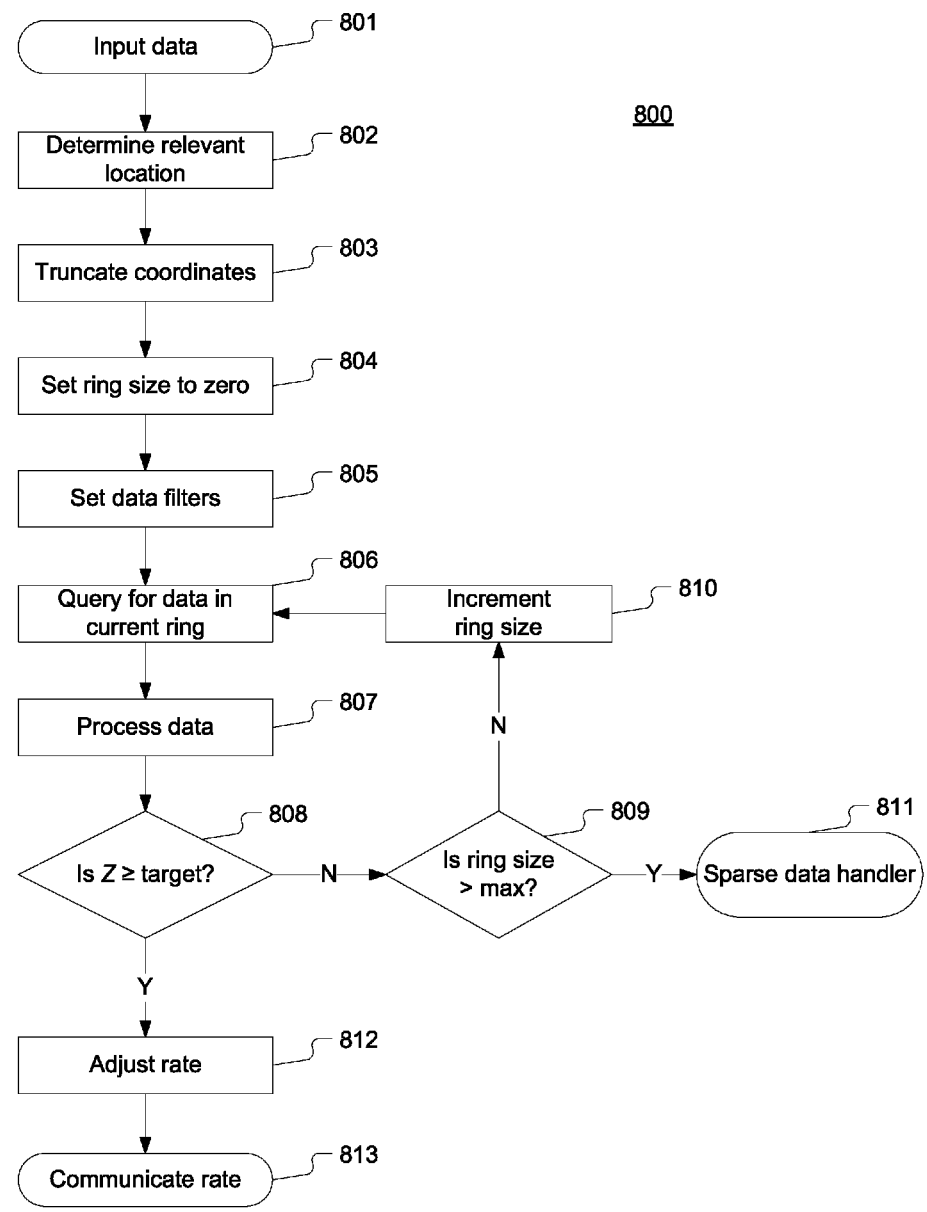
FIG. 8 provides a flow chart, which is illustrative of an embodiment of the invention.

FIG. 8 provides a flow chart, which is illustrative of an embodiment of the invention. Flow chart 800 illustrates an example flow of steps taken to develop a pure premium. Data is input 801 into a database, so that a table of all the GRID cells for a particular state is maintained in a separate database table. Other data may also be input into the system to be used for the analysis, such as grid level data, policy level data, and latitude and longitude level data. The location of the relevant person, property or thing being insured is then determined 802 and an initial selection of the corresponding GRID cell is identified. Longitudinal and latitudinal coordinates are then truncated 803 depending on how the GRID has been truncated for this area. The ring of GRID cells is set or initialized 804 to zero, which will result in a query for data in the target cell. In some embodiments, the ring size is initialized to one after data has been queried for the target cell.

Data filters are set 805 to restrict the query to relevant data. Filters may be incorporated into a database query string, or may be applied to the query results. Filters may, for example, restrict the query to data relevant to:

- types of claim, e.g., auto claims;
- specific perils, e.g., data associated with a fire hazard;
- types of properties, e.g., single-family residence, commercial property, or vacation home;
- classifications of properties, e.g., standard homes, mobile homes, or high-rise home;
- features of properties, e.g., construction material, size, construction cost, waterfront, elevation, or neighborhood characteristics; or
- geographic or political subdivisions, e.g., limited to a state, county, or regulatory district.

The last item listed is of some importance with certain regulated products. Some insurance and financial services products are regulated by local or regional governmental entities. For example, regulation of certain insurance products is performed by state agencies in the United States. These entities may be referred to as regulators. In some embodiments, the database may contain generalized rules and criteria that apply to all policies and specific rules associated with a particular regulator. This arrangement of data would allow, for example, a single computational process to generate a rate for an insurance policy for a property in any state.

Data corresponding to the ring of GRID cells is queried 806. To query 806 the data, a temporary table of data is created for the data existing at the latitude/longitude level. The temporary data is summarized at the level of desired truncation and maintained until the completion of the analysis, since it is reused in each iteration. A query uses the input cell and determines via query which of the other cells in the state fall within the ordered rings up to the maximum distance, for example, 30 miles. Once the data for the other GRID cells are ordered, they are iterated through until a level of credibility is met, using the summarized data. Query 806 produces a target set of data that is associated with the target cell and/or current ring.

The target set of data is then processed 807, once the level is met the values retrieved and weighted based on the GRID ring, by loading the data into an overall calculation that develops a value for Ring O. A determination 808 is then made as to whether the processed data is greater than or equal to the maximum credibility or target credibility. If the credibility of the processed data is not greater than or equal to the maximum credibility or target credibility, then a determination 809 is made as to whether size of the ring of GRID cells has reached a maximum. If the size of the ring of GRID cells has not reached a maximum, then the ring size is incremented 810 by one and the process returns to the query step 806. If the size of the ring of GRID cells has reached a maximum, then a sparse data handler is used to calculate a rate. The process is continued for each GRID cell within a set of latitude/longitude boundaries, for example, defined by a state. If the processed data of step 807 is determined 808 to be greater than or equal to the maximum credibility or target, then a rate is adjusted 812. In some cases, the resulting rate values created are just a portion of the potential rate that would be presented to a customer because there are many factors that may come into play in calculating the final rate. Additional steps may also be added to modify the rate before it is communicated to a customer. Finally, a rate may then be communicated 813 to the potential customer for whom the policy rate quote has been requested.

Sparse data handler 811 provides a mechanism for addressing rating requests that cannot be completed normally as a result of insufficient rating data. In certain embodiments, sparse data handler 811 returns an error message signaling an inability to calculate a pure premium. In some embodiments, the error message may include the calculated pure premium information along with the credibility factor.

Example

As a further example of one aspect of the invention, specific data is provided to illustrate a method having the following steps: collecting data according to GRID rings, determining whether rings have enough historical data to provide actuarially credible results, adjusting the data for distance, and applying credibility weighting. The calculations herein represent a rating means, according to certain embodiments of the present disclosure.

First, historical data may be collected for GRID ring 0 (target GRID). Table 8 illustrates a data collection for claims and loss and loss expenses (referred to below as Loss Amount) for an exemplary target GRID.

TABLE 8

| GRID Ring | Claims | Loss Amount |
|---|---|---|
| 0 | 8 | $20,640 |
| Total | 8 | $20,640 |

Second, historical data may be collected for GRID ring 1. This GRID ring may be for an interval ring having an inside and outside radius at selected distances from the target GRID cell. Table 9 illustrates a data collection for claims and loss and loss expenses for the exemplary target GRID and the exemplary GRID ring 1.

TABLE 9

| GRID Ring | Claims | Loss Amount |
|---|---|---|
| 0 | 8 | $20,640 |
| 1 | 23 | $64,519 |
| Total | 31 | $85,159 |

Historical data may also be collected for GRID ring 2. This GRID ring may be for an interval ring having an inside and outside radius at selected distances from the target GRID cell, but lying outside and surrounding GRID ring 1.

Table 10 illustrates a data collection for claims and loss and loss expenses for the exemplary target GRID, the exemplary GRID ring 1, and the exemplary GRID ring 2.

TABLE 10

| GRID Ring | Claims | Loss Amount |
|---|---|---|
| 0 | 8 | $20,640 |
| 1 | 23 | $64,519 |
| 2 | 93 | $247,717 |
| Total | 124 | $332,876 |

Loss and exposure data may be collected for additional interval rings until maximum credibility is obtained or a maximum distance is reached. In this illustrative example, maximum credibility is obtained with data for only seven GRID rings being collected.

Table 11 illustrates a data collection for claims and loss and loss expenses for the exemplary target GRID (GRID ring 0) and the exemplary GRID rings 1-6.

TABLE 11

| GRID Ring | Claims | Loss Amount |
|---|---|---|
| 0 | 8 | $20,640 |
| 1 | 23 | $64,519 |
| 2 | 93 | $247,717 |
| 3 | 160 | $404,077 |
| 4 | 206 | $581,755 |
| 5 | 348 | $955,226 |
| 6 | 414 | $1,095,219 |
| Total | 1,252 | $3,369,154 |

While the loss and exposure data above is illustrative for one peril or coverage, data may be collected in the same manner for any peril or coverage.

Third, a distance weighting factor may be applied to the loss and exposure data. For this particular example, as shown in FIGS. 9A and 10A, the weighting factor is about 1 for GRID rings 0-3 and GRID rings 0-8, respectively, and then the weighting factor decreases towards zero. Weighting factors may follow any function or curve shape. The weighting factor may even be truncated or it may increase with distance from the target GRID.

Fourth, credibility weighting may be applied using an external data model result, statewide pure premium, prior indicated factor, factor implied by current rate, or any other relevant value as the complement. Credibility standards may be based on varying confidence intervals and acceptable error thresholds.

Fifth, pure premiums may be calculated by peril for expected loss and loss expenses. The loss and loss expenses may be divided by the exposure to determine the loss and loss expenses pure premium. Illustrative results are provided in Table 12 for one peril.

TABLE 12

| Data Item | Value |
|---|---|
| Loss | $818,851.12 |
| Common Risk Exposure | $ 4,280.14 |
| Loss Pure Premium | $ 191.31 |
| Capped Loss Pure Premium | $ 191.31 |
| Credibility Standard | 1,250 |
| Claims | 313 |
| Credibility Factor | 0.50 |
| Model Loss Pure Premium | $ 186.29 |
| Expected L&ALAE PP | $ 188.80 |

An expected loss and loss expenses pure premium may also be calculated based on a provision that represents a long term average loss per exposure or alternatively be set to another appropriate provision, such as setting them equal to statewide pure premiums.

Sixth, pure premiums for the various perils or coverages may be aggregated to an all-peril or all-coverage basis.

Seventh, the all-peril or all-coverage pure premiums can then be used to derive an indicated Location Rating Factor Example Auto GRID (Geographic Rating ID) Rating Methodology According to one exemplary application of the invention, an automobile GRID rating methodology is illustrated. The calculations herein represent a rating means, according to certain embodiments of the present disclosure. A GRID ring experience is included in the calculations for a target GRID cell until one of the following criteria is met: (1) reach full or maximum credibility; (2) reach the maximum distance; or (3) reach maximum change in additional variable (e.g., percent change in population density). The GRID ring experience may be adjusted based on a distance factor. The distance factor may be determined based on a linear or non-linear function of maximum truncated distance from the target GRID cell. The same distance factor may be applied to each cell within a given ring.

According to a methodology for the research plan, a GRID cell experience ring analysis may be conducted based on an insurance provider's historical data to predict non-catastrophe expected pure premiums by coverage. An optimization program may evaluate the following by coverage by: (1) maximum credibility assigned to a target cell's experience area; (2) distance weighting functions applied to ring experience; (3) loss experience period used to develop a target cell's experience and the weight given to each year's experience; and (4) impact of changes in additional variables.

Data and methodology for this auto example are provided in FIGS. 9A-9F. FIG. 9A provides representative GRID distance weighting values, for an automobile example. FIG. 9B provides an overview of the methodology for an automobile example. FIG. 9C provides the GRID ring level data for an automobile example. FIG. 9D provides the GRID cell level data for an automobile example. FIG. 9E provides methodologies for calculating distance between two latitude and longitude coordinate pairs in an automobile example. FIG. 9F provides the results of the distance calculations for an automobile example.

Example

Homeowners GRID (Geographic Rating ID) Pricing Methodology

According to one exemplary application of the invention, GRID rating methodology is illustrated. The calculations herein represent a rating means, according to certain embodiments of the present disclosure. A GRID ring experience is included in the calculations for a target GRID cell until one of the following criteria is met: (1) reach full or maximum credibility; (2) reach the maximum distance; or (3) reach maximum change in additional variable (e.g., percent change in population density). The GRID ring experience may be adjusted based on a distance factor. The distance factor may be determined based on a linear or non-linear function of maximum truncated distance from the target GRID cell. The same distance factor may be applied to each cell within a given ring.

According to a methodology research plan, predictive models based on external data may be built to predict non-catastrophe expected pure premiums by peril. GRID cell experience ring analysis may be conducted based on insurer's historical data to predict non-catastrophe expected pure premiums by peril. An optimization program may evaluate the following by peril: (1) maximum credibility assigned to a target cell's experience area; (2) distance weighting functions applied to ring experience; (3) weight between external data model and ring projected pure premium; (4) loss experience period used to develop a target cell's experience and the weight given to each year's experience; and (5) impact of changes in additional variables. A method may be developed to assign appropriate weights to model and experience based non-catastrophe expected pure premiums by peril. A method may be developed to combine non-catastrophe expected pure premiums by peril to give all-peril non-catastrophe expected pure premiums which would then be used to calculate GRID cell premium relativities.

Data and methodology for this auto example are provided in FIGS. 10A-10F. FIG. 10A provides representative GRID distance weighting vales, for a homeowner's policy example. FIG. 10B provides an overview of the methodology for a homeowner's policy example. FIG. 10C provides the GRID ring level data for a homeowner's policy example. FIG. 10D provides the GRID cell level data for a homeowner's policy example. FIG. 10E provides methodologies for calculating distance between two latitude and longitude coordinate pairs in a homeowner's example. FIG. 10F provides the results of the distance calculations for a homeowner's example.

System

Figure 11:
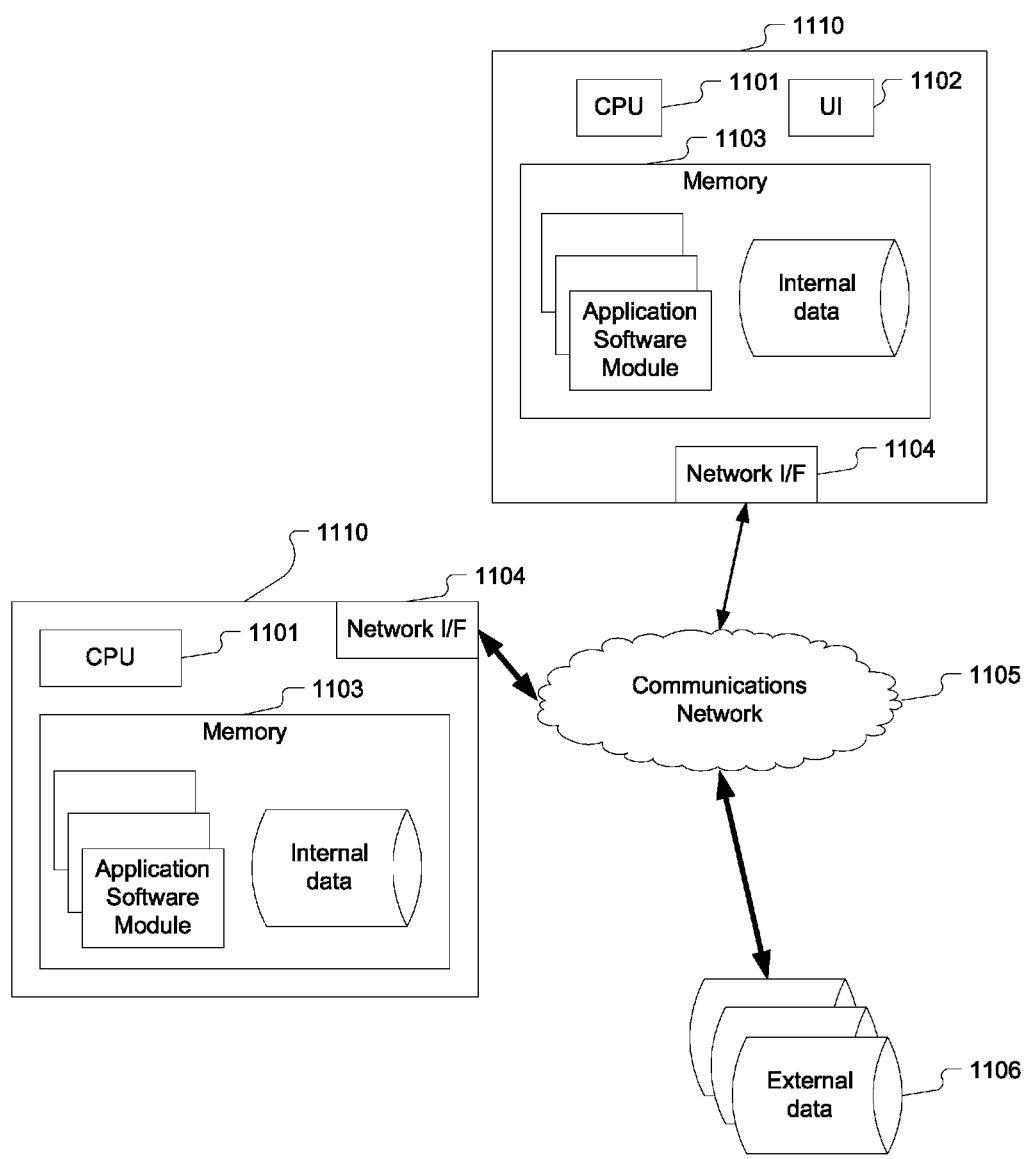
FIG. 11 illustrates a computing and information handling system according to one embodiment of the invention.

FIG. 11 illustrates a computing and information handling system according to one embodiment of the invention. System 1100 comprises one or more computers 1110. Each computer 1110 may comprise a central processing unit (CPU) 1101, a user interface 1102, a memory 1103, and a network interface 1104. The memory 1103 comprises one or more application software modules and one or more internal data stores. System 1100 further comprises a communications network 1105 and external data stores 1106.

Computer 1110 may be any type of general purpose or specialized computer system. In some embodiments computer 1110 may be a personal computer (e.g., an X86-based computer) running a operating system such as UNIX™, OSX™, or WINDOWS™. In some embodiments computer 1110 may be a server or workgroup class system such as those offered by IBM™, HP™, COMPAQ™, or ORACLE™. In other embodiments, computer 1110 may be a mainframe system such as an IBM ZSERIES# mainframe. System 1100 may comprise a heterogeneous or homogeneous network of computers 1110. In some embodiments, computer 1110 may be a mobile device such as a laptop or smart phone.

CPU 1101 may be any general purpose processor including ARM™, X86, RISC, and Z10™. Memory 1103 may be any form or combination of volatile and/or non-volatile tangible computer readable medium including semiconductor memory (e.g., RAM, ROM, flash, EEPROM, and MRAM), magnetic memory (e.g., magnetic hard drives, floppies, and removable drive cartridges), optical memory (e.g., CD-ROM, DVD-ROM, BLURAY™ ROM, and holographic storage). Memory 1103 provides transient and/or persistent storage of Application Software Modules and Internal data. Memory 1103 also provides storage for operating system software including device drivers and system configurations. Network interface 1104 provides data interconnection—via communications network 1105—between computers 1110 and external data 1106.

Internal data may comprise data stored as bitmaps, vectors, objects, tables, and/or files. Internal data may be associated with GRID cells. Internal data may be comprehensive or may be a subset of data limited to a particular geographical region. In some embodiments, internal data may include a limited set of GRID cell data to allow an agent to perform rating operations using a mobile device (e.g., a mobile device running IOS™, ANDROID™, PALMOS™, or WINDOWS™). The data set may be limited to GRID cells in a given metropolitan area, for example. In some embodiments, internal data may be limited to one or more states where an agent is licensed to write policies. In some embodiments, internal data may include a limited set of GRID cell data to allow an agent to rate only certain predetermined perils (e.g., auto and homeowners, but not commercial fire).

Application Software modules comprise software or firmware instructions and configuration information that provides instructions to CPU 1101 to perform the steps of the methods, procedures, and functions disclosed herein. Application Software may be implemented in a compiled and/or interpreted environment. In some embodiments, Application Software modules may be implemented in a high-level programming language such as COBOL, FORTRAN, C, C++, SmallTalk, JAVA™, C#, assembly language, JAVA™ server pages (JSP), application server pages (ASP), or VISUAL BASIC™.

Communications network 1105 may be a heterogeneous or homogenous set of physical mediums (e.g., optical fiber, radio links, and copper wires) and protocol stacks (e.g., ETHERNET™, FDDI, GSM, WIMAX™, LTE, USB™, BLUETOOTH™, FIOS™, 802.11, and TCP/IP.

External data 1106 may be any form of data source. In some embodiments, external data 1106 is received on an optical disk and imported into an internal data store for further processing. In some embodiments, external data 1106 is an external data store hosted on a computer accessible via communications network 1105. External data 1106 may be available for on demand retrieval or may be pushed by a data provider. External data 1106 may be transferred to computer 1110 in whole or in part. This transfer may be periodic, on demand, or as changes occur.

System 1100 may be configured such that one or more of the computers 1110 is configured with hardware and software that enables it to collect internal and/or external data and map that data into an internal data store associated with GRID cell identifiers. One or more computers 1110 are further configured to collect data for each target GRID cell and its adjacent GRID rings, determine whether GRID rings have enough historical data to provide actuarially credible results for each target GRID cell, adjust the data of the GRID rings for distance, apply credibility weighting, and calculate pure premiums for each GRID cell.

The system 1100 is configured such that one or more of the computers 1110 is configured to receive an input request through a user interface 1102 for a rate quote for an insurance policy covering a risk associated with a particular location. The computer 1110 first obtains the latitude and longitude coordinates for the location via direct input (e.g., via user interface 1102), an address cross-reference table (e.g., a geolocation database), direct GPS input, etc. The computer 1110 then executes a look-up process whereby the latitude and longitude coordinates for the location are used to identify a target GRID cell in the GRID cell network. The computer 1110 then generates pure premiums for the target GRID cell and returns a rate quote for the location.

For the purposes of this disclosure, the term exemplary means example only. Although the disclosed embodiments are described in detail in the present disclosure, it should be understood that various changes, substitutions and alterations can be made to the embodiments without departing from their spirit and scope.

What is claimed is:

1. A non-transitory computer readable medium containing a set of computer readable instructions for determining a base rate for a requested hazard insurance policy that when loaded into a computer configure that computer to:
   receive demographic data, fire station data, or other risk-assessment data associated with a location associated with the requested hazard insurance policy;
   receive a coordinate pair including a longitude and latitude of the location;
   determine a coordinate grid block bounded by latitude and longitude lines, which grid block is associated with the coordinate pair and has a size determined at least in part by attributes of the location;
   query a database for a first plurality of existing data associated with the coordinate grid block;
   automatically determine that the quantity of existing data associated with the coordinate grid block is below a threshold level;
   in response to determining that the quantity of existing data associated with the coordinate grid block is below the threshold level, define a current ring of coordinate grid blocks surrounding the coordinate grid block;
   query the database for a second plurality of existing data associated with the current ring of coordinate grid blocks;
   determine a base rate for the requested hazard insurance policy based at least in part on the first and second pluralities of existing data and the demographic data, fire station data, or other data associated with a location; and
   transmit the determined base rate to a user.

2. The non-transitory computer readable medium containing a set of computer readable instructions as claimed in claim 1, that when loaded into a computer further configure that computer to:
   determine a number of latitudinal truncation digits and a number of longitudinal truncation digits defining the size of the coordinate grid block based at least in part on attributes of the location;
   determine a longitude query value by truncating the longitude of the coordinate pair based on the number of longitudinal truncation digits;
   determine a latitude query value by truncating the latitude of the coordinate pair based on the number of latitudinal truncation digits; and
   transmit the longitude query value and latitude query value to the database to query the database.

3. The non-transitory computer readable medium containing a set of computer readable instructions as claimed in claim 1, that when loaded into a computer further configure that computer,
   wherein the step to determine a base rate implements a rate making formula associated with a regulated geographical area subject to regulation of hazard insurance policies wherein the sole source of variable input to the rate making formula is a set of data elements, each of which is associated with one specific coordinate grid block.

4. The non-transitory computer readable medium containing a set of computer readable instructions as claimed in claim 1, that when loaded into a computer further configure that computer to:

determine a grid block size based at least in part on one of:
a peril type,
a quantity of experience data present in the database and associated with the target coordinate grid block,
a population density associated with the coordinate pair, and
a political subdivision associated with the coordinate pair.

5. The non-transitory computer readable medium containing a set of computer readable instructions as claimed in claim 1, that when loaded into a computer further configure that computer to:
determine an attribute representative of a property at the location indicated by the coordinate pair;
select one data filter associated with the representative attribute from a plurality of data filters; and
apply the selected one data filter to the first and second pluralities of existing data.

6. The non-transitory computer readable medium containing a set of computer readable instructions as claimed in claim 1, that when loaded into a computer further configure that computer to, prior to receiving the coordinate pair:
receive a data value that is to be associated with more than one coordinate grid block;
store in the database a first record including information relating to the data value and associated with a first grid block; and
store in the database a second record including information relating to the data value and associated with a second grid block.

7. The non-transitory computer readable medium containing a set of computer readable instructions as claimed in claim 1, wherein the first plurality of existing data associated with the coordinate grid block includes a shared data element that is associated with more than one coordinate grid blocks.

* * * * *

UNITED STATES PATENT AND TRADEMARK OFFICE
CERTIFICATE OF CORRECTION

| | | |
|---|---|---|
| PATENT NO. | : 8,738,407 B2 | |
| APPLICATION NO. | : 13/851217 | |
| DATED | : May 27, 2014 | |
| INVENTOR(S) | : Curt Stewart et al. | |

It is certified that error appears in the above-identified patent and that said Letters Patent is hereby corrected as shown below:

On the title page item (73) Assignee, "State Farm Mutual Automobile Insurance Company, Bloomington, IN (US)" should read -- State Farm Mutual Automobile Insurance Company, Bloomington, IL (US) --.

Signed and Sealed this
Twelfth Day of January, 2016

Michelle K. Lee
*Director of the United States Patent and Trademark Office*